(12) United States Patent
Tieman

(10) Patent No.: US 9,576,414 B2
(45) Date of Patent: Feb. 21, 2017

(54) REMOTE CONTROL BUTTON ACTUATION MODULE, SYSTEM, AND METHOD

(71) Applicant: Tieman Vehicle Technologies LLC, Westfield, IN (US)

(72) Inventor: Craig Arnold Tieman, Westfield, IN (US)

(73) Assignee: Tieman Vehicle Technologies LLC, Westfield, IN (US)

( * ) Notice: Subject to any disclaimer, the term of this patent is extended or adjusted under 35 U.S.C. 154(b) by 0 days.

(21) Appl. No.: 15/228,166

(22) Filed: Aug. 4, 2016

(65) Prior Publication Data

US 2016/0343190 A1 Nov. 24, 2016

Related U.S. Application Data

(63) Continuation-in-part of application No. 14/537,078, filed on Nov. 10, 2014, now Pat. No. 9,409,297.

(60) Provisional application No. 61/920,494, filed on Dec. 24, 2013.

(51) Int. Cl.
*B25J 9/02* (2006.01)
*G07C 9/00* (2006.01)
*H04M 1/725* (2006.01)

(52) U.S. Cl.
CPC ... *G07C 9/00309* (2013.01); *G07C 2009/0042* (2013.01); *G07C 2009/00547* (2013.01); *G07C 2009/00793* (2013.01); *G07C 2009/00984* (2013.01); *G07C 2209/64* (2013.01); *H04M 1/7253* (2013.01)

(58) Field of Classification Search
USPC ....... 700/250, 245, 257, 247, 258, 264, 253, 700/262; 901/490.01, 490.02, 490.04, 901/490.05; 75/490.04
See application file for complete search history.

(56) References Cited

U.S. PATENT DOCUMENTS 4,815,343 A * 3/1989 Sofinowski ........... B23P 19/006
81/431
5,748,854 A * 5/1998 Watanabe ............ G05B 19/423
318/568.16

(Continued)

FOREIGN PATENT DOCUMENTS

KR 2007026743 3/2007
WO 2015100337 7/2015

*Primary Examiner* — Thomas Tarcza
*Assistant Examiner* — Richard Goldman
(74) *Attorney, Agent, or Firm* — Andrus Intellectual Property Law, LLP

(57) ABSTRACT

An actuation system used to actuate one or more buttons on a remote control device, such as a key fob, based upon commands that are generated from a mobile device. The actuation system includes an isolation enclosure that prevents RF signals from entering into or leaving an open interior of the enclosure. The enclosure surrounds a controller, a button actuator and the remote control device. The controller receives the command signals from the mobile device and converts the command signals into position commands that are used to activate the button actuator to move the plunger into alignment with one of the buttons on the key fob. The button actuator moves the plunger into contact with one of the buttons which generates an RF signal from the key fob. The controller utilizes a transmitting antenna to communicate a vehicle command signal out of the isolation enclosure for receipt by the vehicle.

18 Claims, 30 Drawing Sheets

(56) References Cited

U.S. PATENT DOCUMENTS

| | | | |
|---|---|---|---|
| 6,008,636 A * | 12/1999 | Miller | G01R 31/01 |
| | | | 324/757.01 |
| 6,405,099 B1 | 6/2002 | Nagai et al. | |
| 8,241,271 B2 * | 8/2012 | Millman | A61M 1/0058 |
| | | | 604/29 |
| 8,560,118 B2 * | 10/2013 | Greer | A61B 19/201 |
| | | | 700/247 |
| 8,679,096 B2 * | 3/2014 | Farritor | A61B 19/2203 |
| | | | 606/1 |
| 8,761,938 B2 * | 6/2014 | Jenkinson | B25J 9/1697 |
| | | | 700/259 |
| 8,996,166 B2 * | 3/2015 | Jenkinson | G06F 3/0418 |
| | | | 345/174 |
| 8,996,244 B2 * | 3/2015 | Summer | F41H 11/16 |
| | | | 701/36 |
| 9,026,250 B2 * | 5/2015 | Summer | A61G 5/10 |
| | | | 700/245 |
| 9,126,332 B2 * | 9/2015 | Caron L'Ecuyer | A61G 5/10 |
| 9,188,973 B2 * | 11/2015 | Tenney | G06T 7/002 |
| 2002/0084694 A1 | 7/2002 | Quesnel et al. | |
| 2005/0231595 A1 * | 10/2005 | Wang | H04N 17/002 |
| | | | 348/187 |
| 2007/0282483 A1 * | 12/2007 | Kraft | B25J 13/02 |
| | | | 700/245 |
| 2009/0108989 A1 | 4/2009 | Sinclair | |
| 2010/0198402 A1 * | 8/2010 | Greer | A61B 19/201 |
| | | | 700/247 |
| 2012/0316686 A1 | 12/2012 | Dueckman | |
| 2014/0309775 A1 * | 10/2014 | Jenkinson | G06F 3/0418 |
| | | | 700/250 |
| 2015/0217445 A1 * | 8/2015 | Hietmann | B25J 9/0081 |
| | | | 700/264 |
| 2015/0251317 A1 * | 9/2015 | Matsukuma | B25J 9/1697 |
| | | | 700/259 |

\* cited by examiner

REMOTE CONTROL BUTTON ACTUATION MODULE, SYSTEM, AND METHOD

CROSS-REFERENCE TO RELATED APPLICATIONS

The present application is a continuation-in-part (CIP) application claiming priority to and based upon U.S. patent application Ser. No. 14/537,078, filed Nov. 10, 2014, now issued as U.S. Pat. No. 9,409,297, which application is based on and claims priority to U.S. Provisional Patent Application Ser. No. 61/920,494, filed Dec. 24, 2013, the entire contents of which are both incorporated herein by reference.

BACKGROUND

Electronic systems in automotive vehicles and other devices may utilize handheld remote controls with finger-pressable buttons. These devices can be utilized to remotely actuate vehicle or device functions by hand, where such functions may be difficult to access otherwise by a vehicle operator. The remote controls of these electronic systems generally permit secure remote actuation of unlocking, locking, power door and trunk opening, remote engine starting, activation of horns, lights and panic features as well as other types of vehicle or device functions.

In recent years, the rapid and widespread growth in long-range wireless connectivity and sophisticated handheld mobile devices with touch-type graphical user interfaces and short or long-range wireless connectivity has led to the proliferation of machine-to-machine connectivity solutions and "anywhere at any time" device interactivity. Consumers now expect all of their vehicles, homes and devices to be connected and able to be interacted with via their mobile technology from anywhere and at any time.

An increasing number of new vehicles come equipped with built-in wireless connectivity that enables connectivity to these vehicles via mobile devices and web-enabled devices for remote function actuation. Vehicles from General Motors, for example, equipped with ONSTAR telematics connectivity can be remotely started or unlocked with a smartphone running a downloaded software application ("app"). This is a proprietary, designed-in solution available only to purchasers of these vehicles and requires the purchase of an ongoing subscription from ONSTAR for the cellular data connectivity to the vehicle to enable this function.

It is generally known that vehicle electronics suppliers have been offering retrofitted systems to expand the remote control capabilities available to vehicle owners. Directed Electronics, for example, offers aftermarket systems that control more functions and provide longer-range of connectivity, including the addition of telematics communications for control from any location with a smartphone application. One primary limitation of these systems includes the need for extensive custom engineering efforts to enable the electronics to interface to and work with the electronics of the vehicles. In addition, consumers may be required to employ a professional technician for all installation efforts due to the technical complexity of the different vehicle installations. Consequently, these installations are generally expensive for consumers to consider.

More recently, suppliers of aftermarket vehicle electronics have introduced systems that consumers can self-install at low-cost and complexity. Delphi Automotive, for example, has recently introduced a system that can be plugged into a standardized on-board diagnostics (OBD-II) connector found on all light-duty vehicles since 1996. The vehicle owner can easily install the system and, after downloading a smartphone application, can have remote control of vehicle access functions from their smartphone or a web-enabled device. By leveraging features found standard in many vehicles, this system advantageously allows for the addition of a new radio-frequency (RF) transmitter to operate as a secure remote control using procedures built into the vehicle by its manufacturer. Other suppliers are attempting to reverse engineer data bus commands for each vehicle to permit long-range remote control of the functions of the vehicle by transmitting data bus commands onto the OBD-II connector from a consumer-installed device. The main limitations of the RF control technique are that many vehicles do not have any available method for adding a new transmitter by the owner. Additionally, many vehicles have such sophisticated secure RF designs that no method can be found practically to transmit the proper secure codes to a vehicle.

The main limitation of a data bus control technique is the extensive effort to reverse-engineer data bus commands for each vehicle. Additionally, many vehicles cannot be controlled via this connector at some or all of the time, such as when an owner is away from their vehicle due and/or due to a lack of available data bus commands.

U.S. Patent Publication No. 2009/0108989 A1 describes a remote control actuation system using a controller and solenoid(s) to press one or two remote control actuation buttons of a vehicle remote control. The system would be placed in a location within the confines of the vehicle. The '989 application describes an actuation method specific to a single type of remote control with a specific button location layout. The '989 application does not describe a configurable, or adaptable, system for mounting or actuating more than 2 buttons. The '989 application also fails to accommodate the numerous and widely-varying remote control multi-button designs found on vehicle remote control fobs, for example. Vehicle remote controls can have from 2 to 8 buttons in any type of layout and orientation on up to 3 surface planes of the remote control, varieties of package sizes and designs without a mechanical key blade and ones with fixed or movable mechanical key blades.

The '989 application also fails to provide for the linkage of remote control actuation to a user's mobile devices, e.g., a mobile smartphone application. Furthermore, the '989 application fails to describe a technique for blocking the vehicle detection of the remote control within the vehicle by low-frequency techniques used in vehicle immobilization or push-button engine start features. It is generally understood that vehicles and their remote controls can include a low-frequency circuitry that enables secure detection of the presence of the remote control within the vehicle. As such, blocking the RF function of the remote control and detection of the presence of the remote control can be used to prevent or alleviate the vehicle from being a target of drive-away theft.

Therefore, there is a need in the art for a remote control to control the functions of a vehicle and/or other device, specifically for a singular design for wireless connectivity enhancements of linkage to mobile devices which can be added to all existing vehicle or device remote control systems without special tools or training.

BRIEF SUMMARY

The presently disclosed embodiments, as well as features and aspects thereof, are directed towards a remote control button actuation system that includes a button actuator tip mounted configurable to actuate the buttons on a remote control for vehicle or device. In one embodiment of the disclosure, the button actuator tip can be moved to any position over the surface of the remote control by actuating first and second servo motors operably linked to the boom to control boom rotation angle and boom extension distance. Once positioned over a remote control button, the button actuator tip, operably linked to a third servo motor, may be lowered to press a remote control button. The servo motors may be controlled by a programmable controller that receives signals from either a mobile device via short or medium-range wireless signals or from a separate telematics gateway device which extends the range of control to the mobile device.

The various embodiments of the controller may include configurable nonvolatile memory that can provide storage of data, such as data representative of the proper servo positions for all buttons on an installed vehicle or device remote control. The data may be loaded into the memory of the controller at manufacture, programmed after sale by using a one-time calibration process performed by a user, selectable or generated upon the entrance of a code, down loadable, etc. The system may be powered by an internal power supply using either internal or external batteries, or may be powered by interfacing to another power source such as a 12-volt source available in the vehicle. A casing or holder can secure the remote control in place, for actuation by the machine, such as by using a clamping system with pads held tightly under spring tension and opened for remote control placement between the clamping pads by a simple linear motion on a clamp arm. The system with the included remote control may be located within a vehicle in a hidden location to prevent theft. Alternatively or in addition to, the system can be located proximate or near the controlled device.

In another embodiment, the machine and/or controller may be operated by remote control and thus this disclosure includes a method to calibrate and operate the remote control machine and controller by RF means or any form of wireless transmission including but not limited to the unlicensed spectrum, BLUETOOTH, WIFI, etc.

Another embodiment includes a method of remotely actuating the buttons of a remote control by mounting a remote control with actuatable buttons in proximity to a machine to actuate buttons of the remote control. An exemplary machine may include a rotatable pivot secured to a base and a boom comprising a first end and second end. The boom is mounted, e.g., rotatably mounted on the rotatable pivot at the first end and reversibly extendable from the pivot. An actuator is fixedly mounted on the second end. The pivot, the boom and the actuator are configurable to raise and lower a tip to actuate the buttons of the remote control. Another embodiment includes a computer program product that includes a computer readable medium having computer readable code embodied therein. In such an exemplary embodiment, the computer readable program code is adapted to be executed by a processor to implement a method of remotely actuating the buttons of a remote control. When executed, the computer readable code causes the computer and/or devices interfaced thereto to actuate buttons, switches or actuators of a remote control mounted to a holder and proximate to a actuation machine.

In another contemplated embodiment, the machine includes a rotatable pivot secured to a base and a boom comprising a first end and second end. The boom is rotatably mounted on the rotatable pivot at the first end and reversibly extendable from the pivot. An actuator is fixedly mounted on the second end, and wherein the pivot, the boom and the actuator are configurable to raise and lower a tip to engage the buttons of the remote control.

In an alternative embodiment, an exemplary machine may include a boom mounted on a rotatable pivot, which rotatable pivot is secured to a base, and a button actuator assembly slidable along the boom. The pivot, the boom and the button actuator assembly are configurable to raise and lower a tip to actuate the buttons of the remote control.

In accordance with another embodiment of the present disclosure, the actuation system includes an isolation enclosure that is designed to prevent radio frequency (RF) signals from entering into or leaving an open interior of the isolation enclosure. The isolation enclosure is preferably formed from a metallic material to prevent the transmission of the RF signals. The isolation enclosure completely surrounds a key fob that is located on a remote control support within the open interior of the isolation enclosure. The remote control support securely receives and retains the key fob in a known location within the open interior.

A controller, also located within the open interior, is configured to receive command signals from a mobile device. Based upon the command signals received from the mobile device, the controller converts the command signals into position commands used to move the button actuator. Since the controller is positioned within the isolation enclosure, the controller is coupled to a receiving antenna that is generally aligned with a first opening in the isolation enclosure to receive the wireless command signals from the mobile device. The controller is in further communication with a transmitting antenna, which is also aligned with the same opening or another opening in the isolation enclosure. The transmitting antenna is able to transmit vehicle command signals out of the isolation enclosure for receipt by the operating systems within the vehicle.

A key fob antenna is positioned within the isolation enclosure to receive the control signals from the key fob and communicate these signals to the controller. Based upon the received signals from the key fob, the controller retransmits the control signals received from the key fob as the vehicle command signals. In this manner, the actuation system is able to isolate the key fob and controller from outside RF signals while still allowing the key fob and controller to transmit vehicle command signals to the vehicle.

In one embodiment of the disclosure, the button actuator includes three separate servo motors that are each operable to move the plunger in one of three transverse directions. The three servo motors are independently operable by the controller and are each used to move the plunger in one of the three transverse directions.

In one embodiment of the disclosure, a force translating device is positioned within the open interior of the isolation enclosure. The force translating device is able to convert the movement of the plunger in a third direction into movement in a direction that is either transverse to the third direction or opposite to the third direction. In this manner, the force translating device is able to depress a button on either a side surface of the key fob or on a back surface of the key fob.

BRIEF DESCRIPTION OF THE SEVERAL VIEWS OF THE DRAWING

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
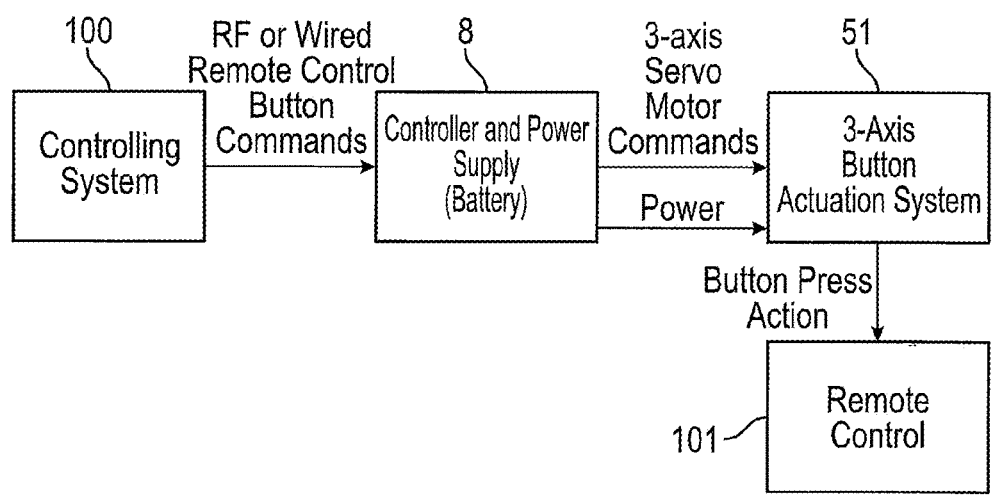
FIG. 1 is a mechanization diagram showing exemplary components of an embodiment of the remote button actuation system.

Aspects, features and advantages of several exemplary embodiments of the remote button actuation system will become better understood with regard to the following description in connection with the accompanying drawing(s). It should be apparent to those skilled in the art that the described embodiments of the present description provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present description as defined herein and equivalents thereto. Hence, use of absolute terms such as, for example, "will," "will not," "shall," "shall not," "must" and "must not" are not meant to limit the scope of the present description as the embodiments disclosed herein are merely exemplary.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content," as referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions and burdens.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

FIG. 1 shows a mechanization diagram of the remote control button actuation system in accordance with the description. In one embodiment the controlling system 100 may be a wireless mobile device, which operates to send user commands via wireless RF or other wireless technology, including optical and audible technology, directly to the controller and power supply 8. It will be appreciated that throughout this description, the term RF or RF wireless are used but, in all such instances unless specifically mentioned otherwise, any wireless or wired technology could also be utilized in such situations. In another embodiment, the controlling system 100 may be a gateway device located within the vehicle or nearby the device under control and, which connects wirelessly via RF or via wires to the controller and power supply 8. The controller and power supply 8 receives an actuation command from the controlling system 100. The actuation command may include a variety of information and one such example is to include the identity of a particular remote control button that is to be actuated and a specific duration of time to actuate the button. The commands may include a variety of other information such as, time of day to actuate the button, a sequence of buttons to be actuated, a request for multiple presses of a single button, etc. The controller and power supply 8 converts these commands into specific servo motor commands that cause the provision of actuating power to the 3-axis button actuation system 51, which presses the selected remote control 101 button for the required duration and then releases the button, or otherwise performs the requested command. It will be appreciated that in some embodiments, the pivot arm may include multiple tips and a further servo could be used to control the relative location of the multiple tips. For instance, if a certain function requires two buttons to be pressed simultaneously, the server could operate to position the tips relative to each other at a certain distance to ensure actuation of both buttons. When only a single button needs to be actuated, the servo can move the additional tip out of the way or, bring all the tips in to close proximity such that they operate as a single tip.

Figure 2:
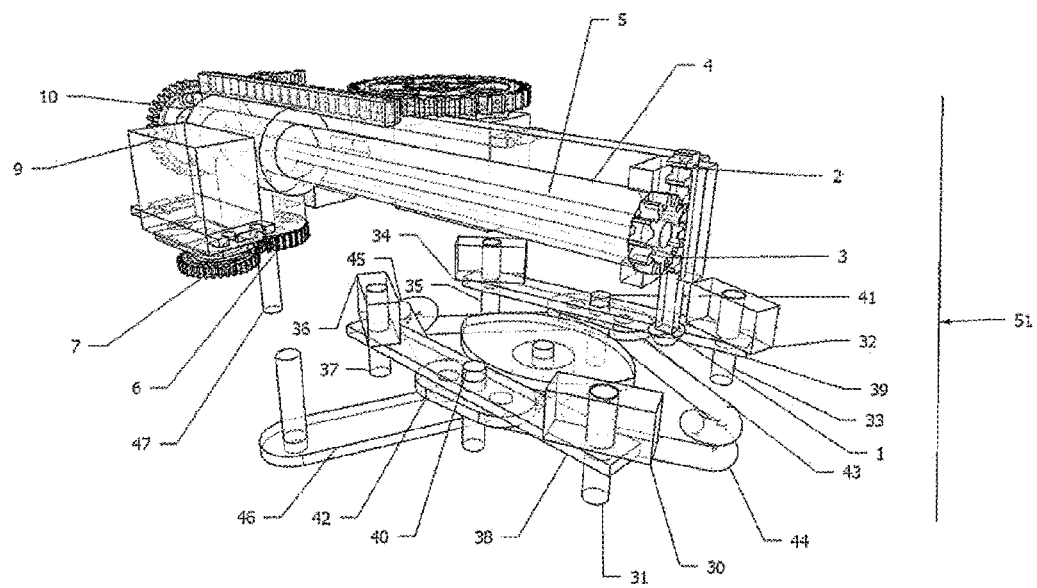
FIG. 2 is a right-side isometric view of the remote button actuation system of FIG. 1 constructed in accordance with the description with the enclosure not shown.

FIG. 2 is a right-side isometric view of an exemplary 3-axis button actuation system 51. A button actuator tip 1 is attached to a z-axis rack gear 2, which is held in position by a motor support bracket 28 and attached to a sliding boom 4. The tip 1 can be moved vertically when the z-axis pinion gear 3 rotates. Z-axis pinion gear 3 is attached to one end of a z-axis driveshaft 5, which extends longitudinally through the entire length of sliding boom 4. Sliding boom 4 is held by boom support 10, which enables the sliding boom to move horizontally to reposition button actuator tip 1. Boom support 10 rotates about the vertical axis on boom support pivot pin 47, which is attached to the mounting enclosure 50 shown in FIG. 5. Angle-axis driven gear 6 is also mounted to the boom support pivot pin 47 and the enclosure 50. Angle-axis servo motor 9 is attached to boom support 10 and rotates angle-axis drive gear 7, which is engaged with angle-axis driven gear 6.

Remote control clamp pad 30 is mounted on clamp pad pivot pin 31, which is attached to one end of clamp pad support 38. Clamp pad 36 and clamp pad pivot 37 are mounted to the opposite end of clamp pad support 38. Clamp pad support 38 is mounted to clamp pad support pivot pin 40, which rotates on spring bracket 42. Clamp pad 32 is mounted on clamp pad pivot pin 33 and which is attached to one end of clamp pad support 39. Clamp pad 34 and clamp pad pivot 35 are mounted to the opposite end of clamp pad support 39. Clamp pad support 39 is mounted to clamp pad support pivot pin 41, which rotates on spring bracket 43. Clamp pad tension spring 44 mounts to one end of spring bracket 42 and spring bracket 43. Clamp pad tension spring 45 mounts to the opposite ends of spring bracket 42 and spring bracket 43. Clamp pad tension release control arm and cam 46 is mounted to the enclosure 50 and rotates about the vertical axis to rotate the cam against the spring brackets 42 and 43. The clamp pad support pivot pins 40 and 41 move in the clamp pad support slide holes 57 and 58 of FIG. 5a in the enclosure 50.

Figure 3A:
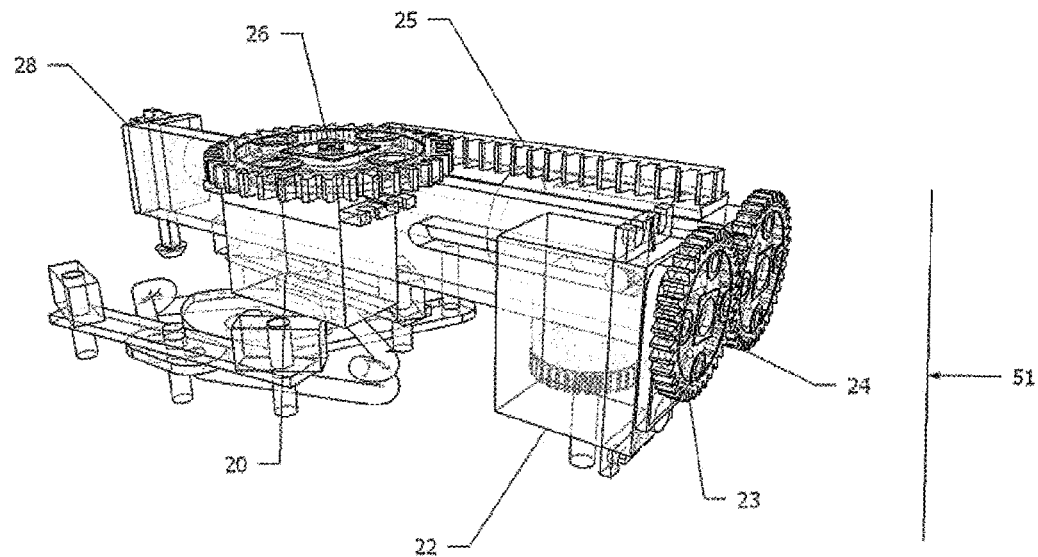
FIG. 3a is a left-side isometric view of the remote button actuation system of FIG. 2.
Figure 3B:
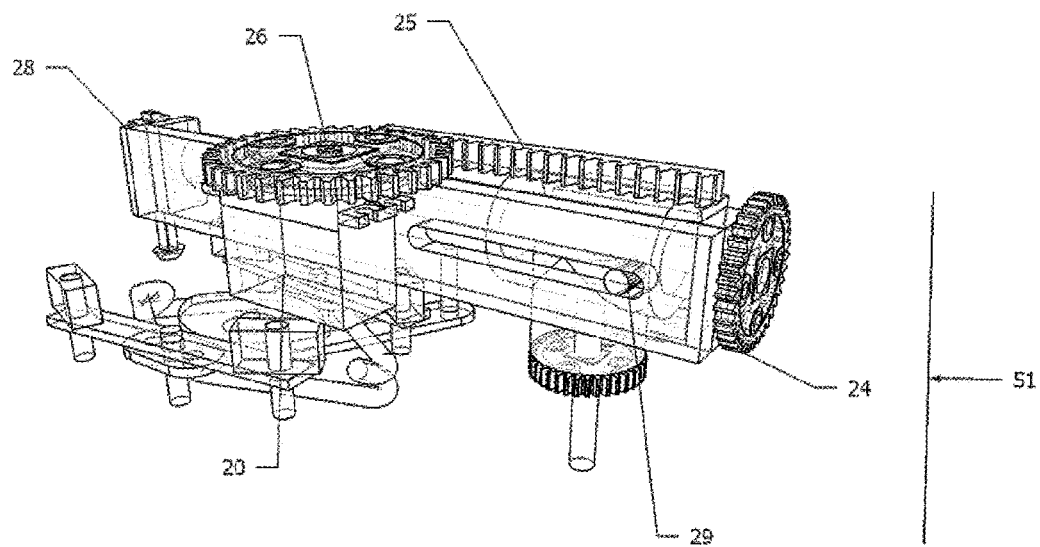
FIG. 3b is the view of FIG. 3a with z-axis servo motor and z-axis drive gear hidden from view.

FIG. 3a is a left-side isometric view of the 3-axis button actuation system 51 constructed in accordance with one embodiment. Z-axis driven gear 24 is attached to the opposite end of z-axis driveshaft 5 from the z-axis pinion gear 3. Z-axis servo motor 22 rotates z-axis drive gear 23 which is engaged with z-axis driven gear 24. R-axis rack gear 25 is attached longitudinally to the top of boom support 10. R-axis pinion gear 26 engages with r-axis rack gear 25 and is rotated by r-axis servo motor 20. Z-axis servo motor 22 and r-axis servo motor 20 are both mounted to the surface of motor support bracket 28 which is, in turn, mounted to each end of the sliding boom 4. FIG. 3b is a left-side view of FIG. 3a with z-axis servomotor 22 and z-axis drive gear 23 removed. Sliding boom anti-rotation pin 29 is attached to boom support 10 and slides in a slot in motor support bracket 28 to prevent rotation of sliding boom 4 when it is moving longitudinally within the boom support 10.

Figure 4:
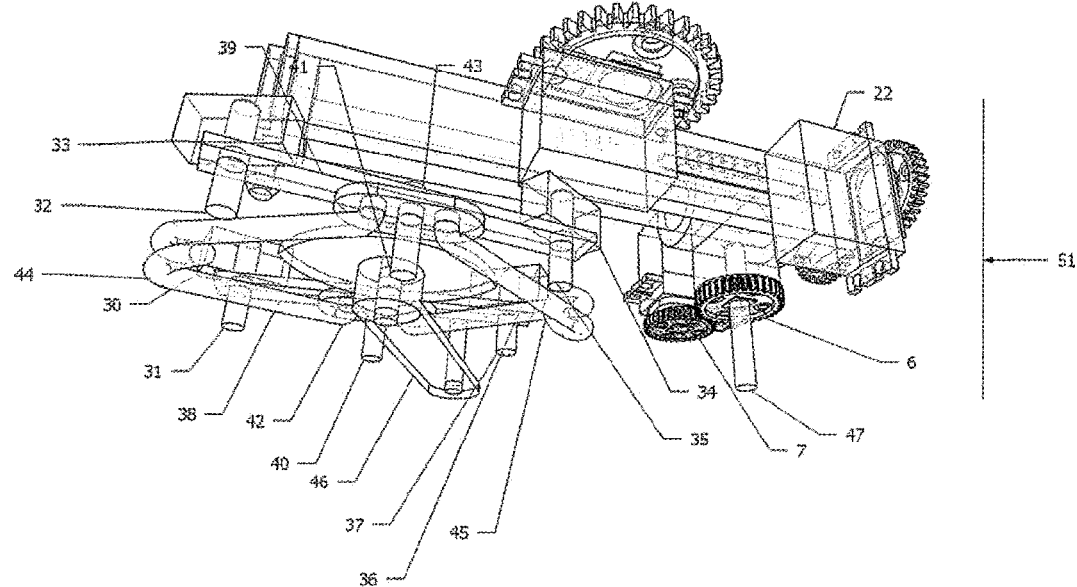
FIG. 4 is a bottom-side isometric view showing the remote control holder of the system of FIGS. 2 and 3.
Figure 5:
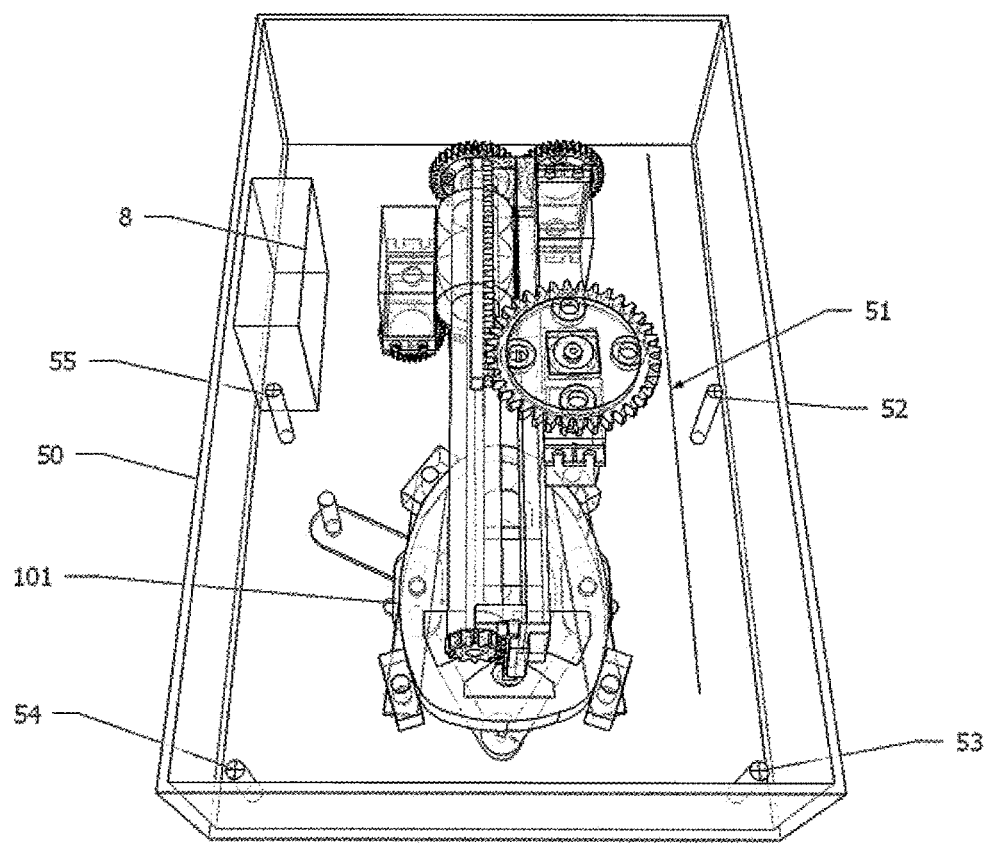
FIG. 5 is a top-side isometric view showing the entire system of FIGS. 2 and 3 showing the enclosure housing with a remote control clamped within the remote control holder.
Figure 5A:
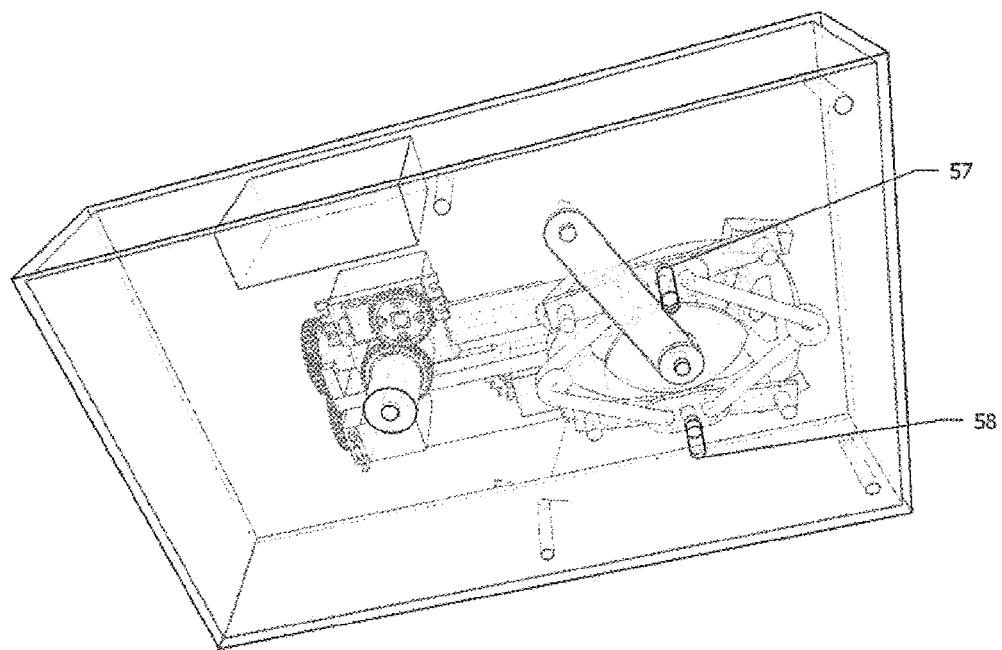
FIG. 5a is a bottom-side isometric view showing the entire system of FIGS. 2 and 3.
Figure 6:
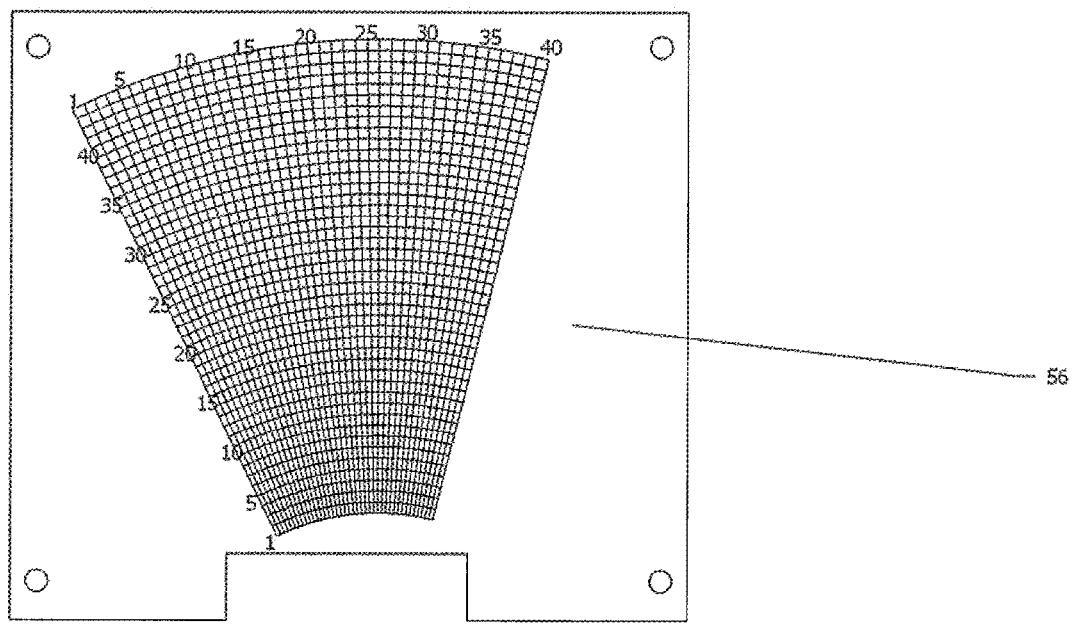
FIG. 6 is a view of the calibration guide.
Figure 7:
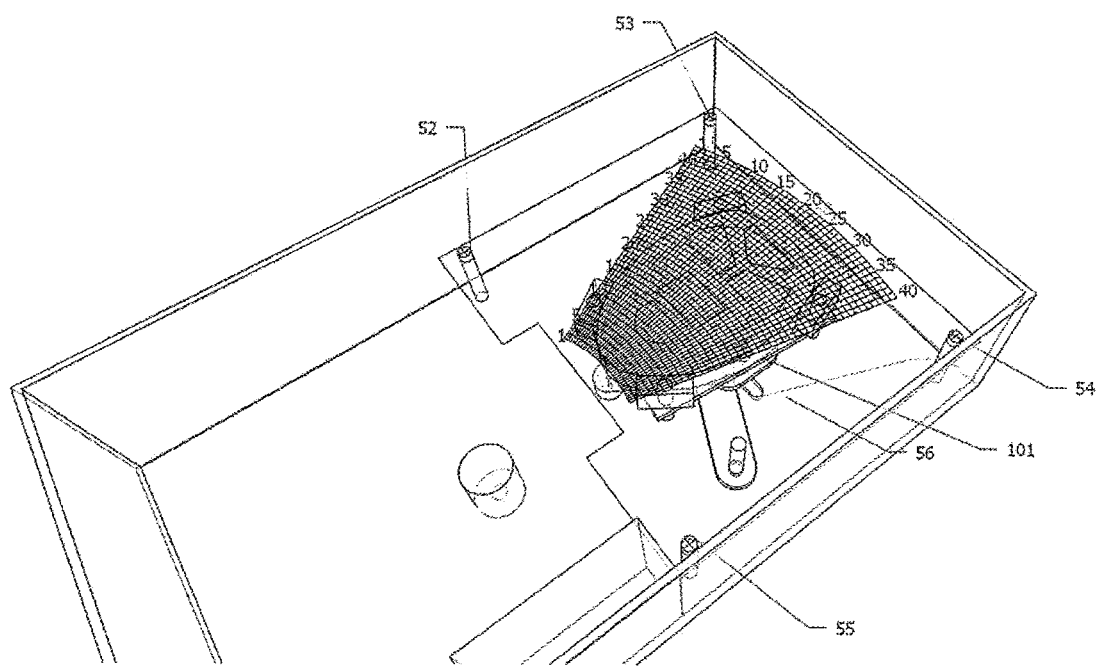
FIG. 7 is a right-side isometric view of the calibration guide installed over the calibration guide alignment pins of the remote button actuation system of FIGS. 2 and 3 with the 3-axis actuator not shown.

FIG. 4 is a bottom-side isometric view of the 3-axis button actuation system 51 constructed in accordance with one embodiment. FIG. 5 is a top-side isometric view of the controller and power supply 8 and 3-axis button actuation system 51 mounted with the housing 50 and constructed in accordance with one embodiment. Remote control 101 is shown mounted within the 3-axis button actuation system 51 and held firmly in place by clamp pads 30, 32, 34 and 36 by clamp pad tension springs 44 and 45. Calibration guide alignment pins 52, 53, 54 and 55 are shown protruding from the inside bottom surface of housing 50. FIG. 6 shows transparent calibration guide 56 used in one embodiment. FIG. 7 shows calibration guide 56 mounted on calibration guide alignment pins 52, 53, 54 and 55 using holes at each corner of calibration guide 56. The installed remote control 101 is located just below the calibration guide 56.

Figure 8:
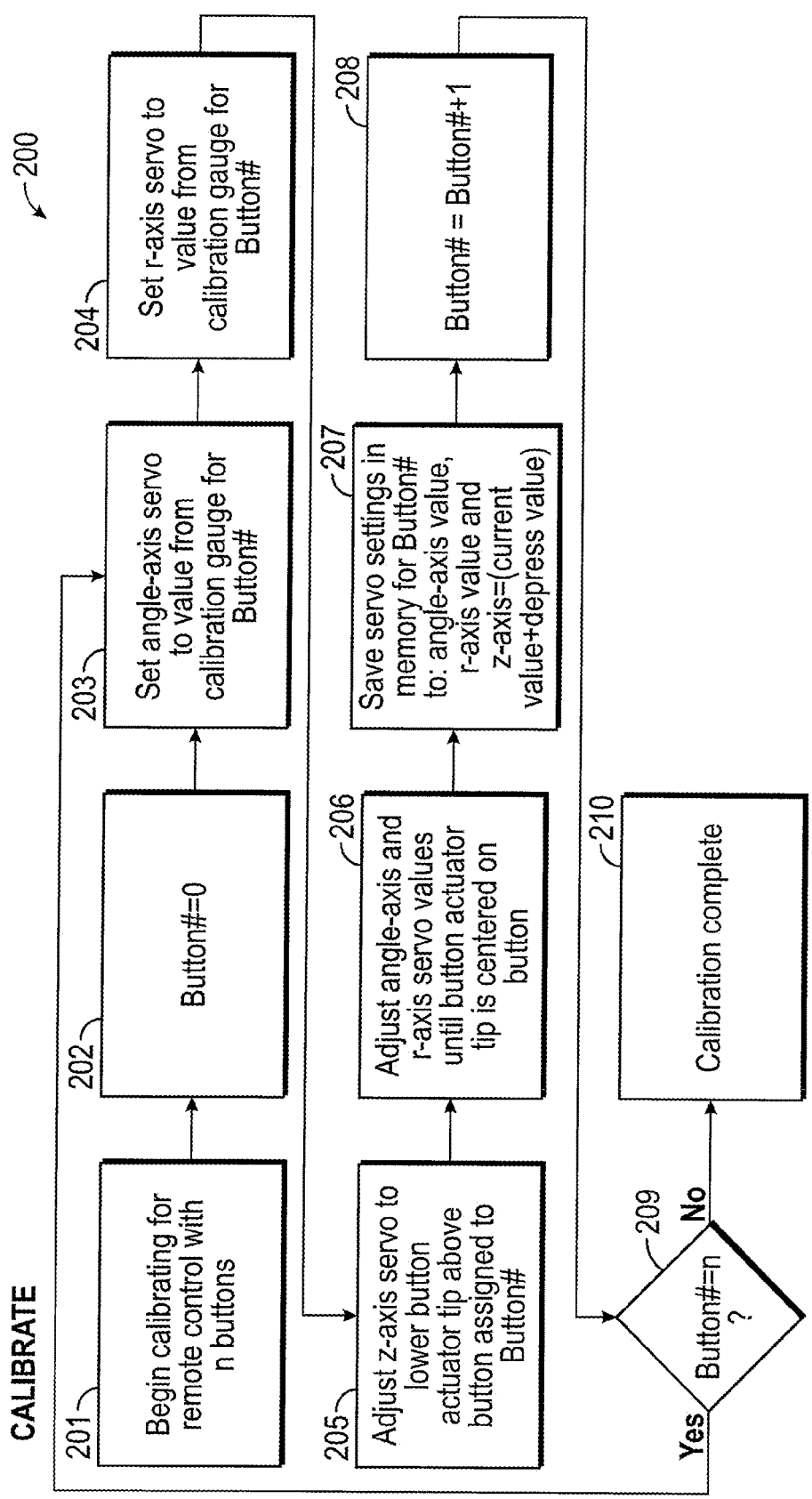
FIG. 8 is a flowchart describing the calibration of the remote control button actuator of FIGS. 2 and 3.
Figure 9:
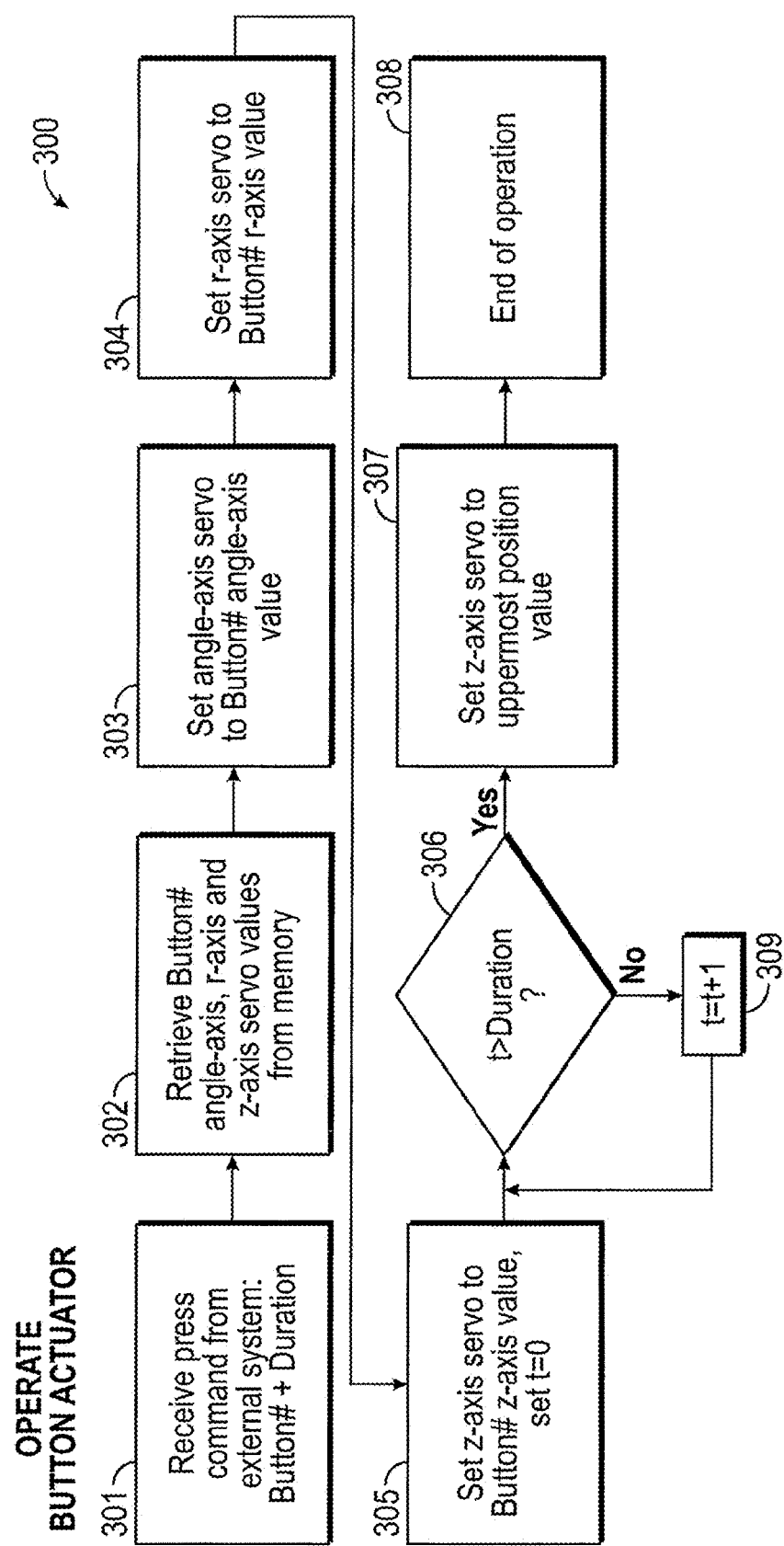
FIG. 9 is a flowchart describing the operation of the remote control button actuator of FIGS. 2 and 3.

FIG. 8 is a flowchart describing the calibration process for the 3-axis button actuation system 51 according to one embodiment. FIG. 9 is a flowchart describing the operation process for the 3-axis button actuation system 51 according to one embodiment.

In other embodiments, servo gears, pinions and racks could be replaced with link arms and linkages to transfer rotational forces and cause rotational and linear motions of the 3-axis button actuation system 51. The z-axis servo and gears could be replaced by a two-position solenoid to move the button actuator tip 1 vertically. The fixed-length sliding boom 4 and z-axis driveshaft 5 could be replaced by telescoping elements as a means to conserve enclosure 50 space. An alternative method of moving the button actuation tip 1 over the remote control 101 button area could be constructed using x-axis and y-axis servo motors with an x-y sliding table. To enable compatibility with remote controls 101 which have buttons on more than one surface, such as sides or bottom, the addition of adjustable levers and pivot points would enable the downward button actuator tip 1 motion to be translated into lateral or upward forces for pressing those buttons. For remote controls which have additional RF circuitry for use in secure remote control presence detection by a vehicle or device to enable functions such as enabling engine start, these RF detection functions may need to be blocked to prevent detection of the remote control in the presence of the vehicle or device. RF blocking materials in the housing could be used to passively prevent detection or active RF circuitry, including an antenna and transmitter could be used to, under controller and power supply 8 command, activate or deactivate RF blocking.

FIG. 13, FIG. 14, FIG. 15, FIG. 16 and FIG. 17 show an alternative embodiment, i.e., machine 400 comprising boom 402 that is mounted to fixed shaft 408 proximate to pivot end 404. Fixed shaft 408, fixedly mounted on box 600, passes through an opening (not shown) in boom 402. One or more bushings (not shown) positioned between boom 402 and fixed shaft 408 allow the boom to rotate about fixed shaft 408 such that boom distant end 406 moves along arcuate path 412. Servo motor 414 is linked to drive gear 416A that engages pivot gear 416B to move boom 402 about axis 410. Button actuator 418 is slidable along boom 402. Lever 422 is mechanically coupled to the actuator by arm 424. Gates 420A and 420B, formed in the housing of actuator 418, limit the movement of actuator 418 along the length of boom 402. Lever 422 is driven by servo motor 426 to which lever 422 is mechanically linked. Downward button actuator tip 428 is reversibly driven by gear 430. Gear 430 is driven by a third servo motor 446.

Remote control 500 is held proximate to machine 400 by pads 432, 434, 438, and 440. Pads 432 and 434 are resiliently biased against remote control 400 by member 436. Pads 438 and 440 are resilient biased against an opposite side of remote control 500 by member 444. Members 442 and 444 are anchored to box 600, e.g., to walls 602 and 604, respectively.

Thus, it is clear from the above-presented embodiments of the remote control button actuator system that some embodiments utilize a 3-axis servo-controlled actuator to permit universal remote control actuation with a plurality of buttons to be actuated. In addition, the embodiments present the use of a spring-loaded, adjustable remote control holder so as to facilitate the adjustment of any type of remote control. Advantageously, the remote control actuation system alleviates, and in some instances, eliminates the problem encountered by other systems which attempt to take control of devices (e.g. automotive keyless entry) via hard-wired or RF methods and which require extensive reverse engineering on a vehicle-by-vehicle basis or sacrificing of expensive remote controls which are used for code harvesting. Furthermore, the described embodiments of the actuation system do not require the use of dedicated solenoids for each remote button on the remote controller. Further, the various embodiments do not require special brackets or tooling to hold different types of remotes.

Operation

In operation, a user connects the controlling system 100 to the controller and power supply 8 either using a wireless RF or wired connection. Software applications running within the user's mobile device and controlling system 100 operate to provide remote control of the controller and power supply 8. The first-time setup process would involve preparing the controller and power supply 8 and 3-axis button actuation system 51 for remote control 101 installation by the user. The button actuator tip 1 would be retracted and moved out of the way to permit remote control 101 installation. The user would move the clamp pad tension release control arm and cam 46, causing the cam to act against the spring brackets 42 and 43 to move the clamp pads 30, 32, 34 and 36 outward. The remote control 101 can then be placed between the clamp pads and the clamp pad tension release control arm and cam 46 would be moved back to place the remote control 101 under tension from clamp pad tension springs 44 and 45. It should be appreciated that in some embodiments, specific holders that are designed to receive specific remote control models may be utilized rather than the clamp. Further, the system may include an interface for receiving one of a plurality of specific holders such that a specific holder can be installed for a specific application.

With reference to FIGS. 13-17, in the alternative exemplary embodiment, remote control 500 is resiliently biased against pads 432, 434, 438, and 440 and fitted into position under the actuation device 400. Servo motors 414 and 426 position actuator tip 1 (not shown) over the appropriate button on remote control 500. A third servo motor 446 drives down the rack gear on downward button actuator tip 428, thus actuating the desired button. The alternative exemplary embodiment may also be programmed according to the steps and description for the embodiments of FIGS. 1-12.

The transparent calibration guide 56 would be placed and aligned over the calibration guide alignment pins 52, 53, 54 and 55. The user would make a mark with a fine-tipped marker on the calibration guide over the center of every remote control 101 button. The calibration guide would be removed and the numbered intersecting lines closest to each mark identified for the angle-axis and r-axis settings for each button.

FIG. 8 shows the calibration procedure 200 which would be performed by the user in conjunction with a software application running on a mobile device, beginning with step 201. For each of n buttons on a user's remote control, a series of steps may be followed. Step 202 initiates a button counter for the first button. Step 203 uses the angle-axis calibration value from the calibration guide 56 for the current button to drive the angle-axis servomotor 9 to that value. Step 204 uses the r-axis calibration value from the calibration guide 56 for the current button to drive the r-axis servo motor 20 to that value. Step 205 has the user activating the z-axis servo motor 22 to lower the button actuator tip 1 until it just contacts the current remote control 101 button. The user would visually examine the location of the button actuator tip 1 and determine if it were properly centered over the button. If not, step 206 shows how the user would use the application to make minor adjustments in angle-axis and/or r-axis servo values to center the button actuator tip 1. Step 207 would have the user save the current servo settings, with an additional depress value being added to the current z-axis servo value, into nonvolatile controller and power supply 8 memory. Step 208 shows the button counter being incremented for the next button and step 209 checks if the final button has been calibrated. If not, steps 203 through 208 will be repeated for the next button. If this is the final button, step 210 completes the calibration process.

In another embodiment, the calibration procedure 200 could be further automated using a mobile device equipped with a camera and a specific application to take a photograph of the remote control 101 and with the calibration guide alignment pins 52, 53, 54 and 55 in the photograph to be used as image reference guides. The application would be used by the user to identify each remote control 101 button and determine the appropriate angle-axis, r-axis and z-axis servo values to save during the calibration process. Additionally, the software application would permit the user to create the duration of every button press specific to each vehicle or device and create additional commands which would link multiple, serial button commands into a single function, such as a remote start command which required one button to be pressed for 0.5 sec. followed by a second button to be pressed and held for 2 seconds.

Once calibrated, the user would send a button command from their mobile device through the controlling system 100 to the controller and power supply 8. The flowchart of FIG. 9 illustrates the operate button actuator 300 process. Step 301 begins with the command from the controlling system 100 identifying the button number and duration of press. Step 302 shows retrieving the saved servo values from the controller and power supply 8 nonvolatile memory for the angle-axis servo motor 9, r-axis servo motor 20 and z-axis servo motor 22. Step 303 shows sending the correct angle-axis value to the angle-axis servo motor 9 to rotate the boom support 10 to the correct angle. Step 304 shows sending the correct r-axis value to the r-axis servo motor 20 to extend the sliding boom to the correct length. Step 305 shows sending the correct z-axis servo value to the z-axis servo motor 22 to lower the button actuator tip 1, thus pressing the remote control button, and initiating a duration timer. Step 306 checks if the button press duration has been exceeded. If not, the timer is incremented in step 309 and step 306 checks the timer again. Steps 306 and 309 are repeated until the timer duration is exceeded. When step 6 exits with the timer duration exceeded, step 307 sends the uppermost button actuator tip 1 position value to z-axis servo motor 22 to return the button actuator tip 1 to the uppermost position. Step 308 shows the end of the operate button actuator process 300.

Figure 10:
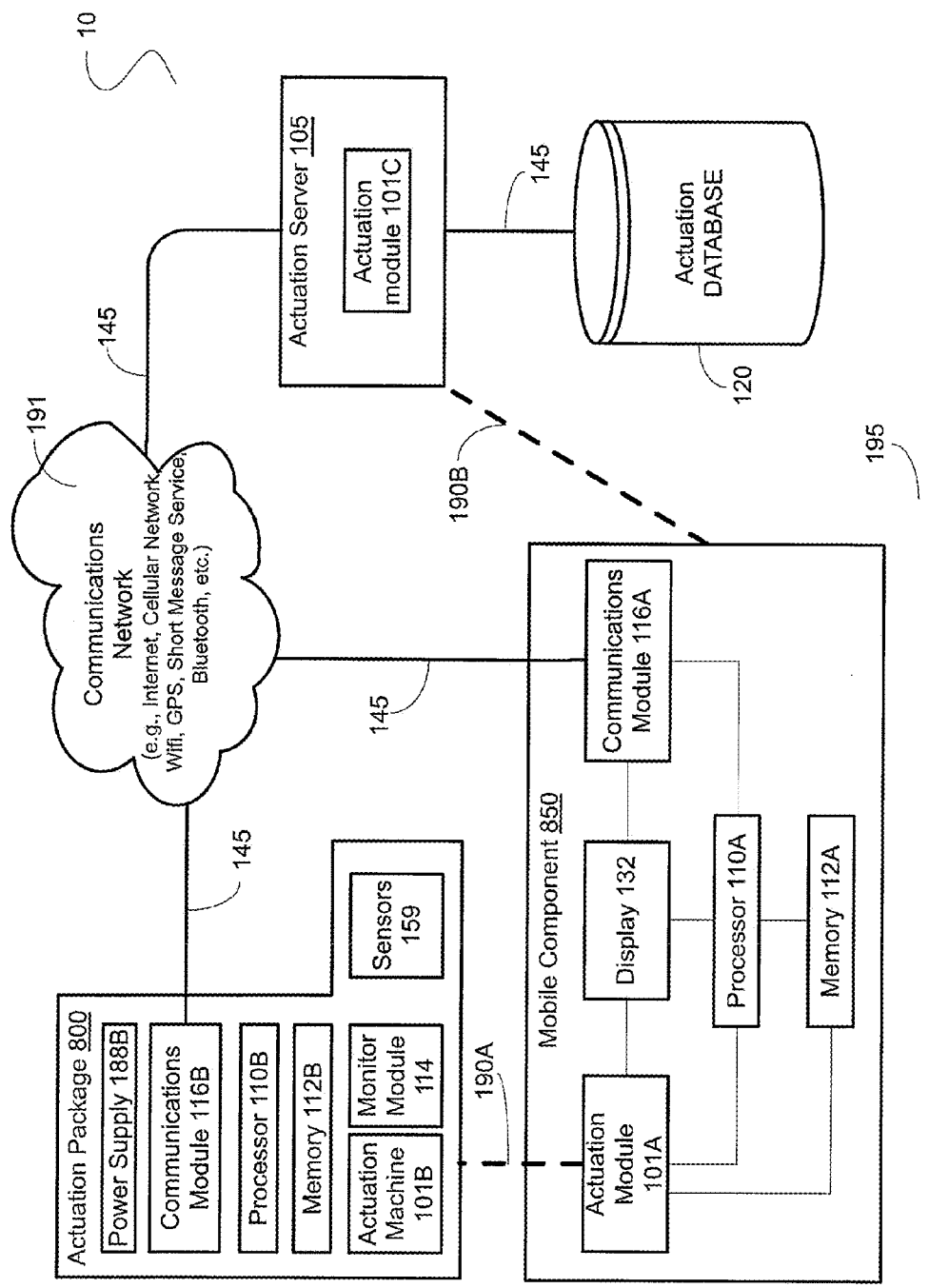
FIG. 10 is a schematic diagram illustrating an exemplary architecture for remote control actuating embodiments.

Turning now to FIG. 10, illustrated is a high level functional block diagram of an exemplary architecture of a system 10 for remote actuation. For example, a vehicle having an actuation package 800, controlled by a user carrying a portable computing device 100, such as a Smartphone, on his person would be one embodiment of the actuation component 100 and the mobile component 850 of such architecture.

Notably, although the FIG. 10 illustration depicts an actuation package 800 and a mobile component 850, it will be understood that not all embodiments of the disclosed system and method require a mobile component 850 and a actuation package 800 to be within a proximate to a user. That is, it is envisioned that certain functionality in an embodiment may be implemented via a remote computing device such as a server 105. In such embodiments, the actuation package 800 may communicate with the server 105 via a communications network 191 without need to communicate 190A with a mobile component 850. In other embodiments, an actuation package 800 may communicate with either or both of the server 105 and the mobile component 850. Similarly, in some embodiments, the mobile component 850 may transmit data to and/or from the server 105 via link 190B which is implemented over communications network 191.

Figure 12:
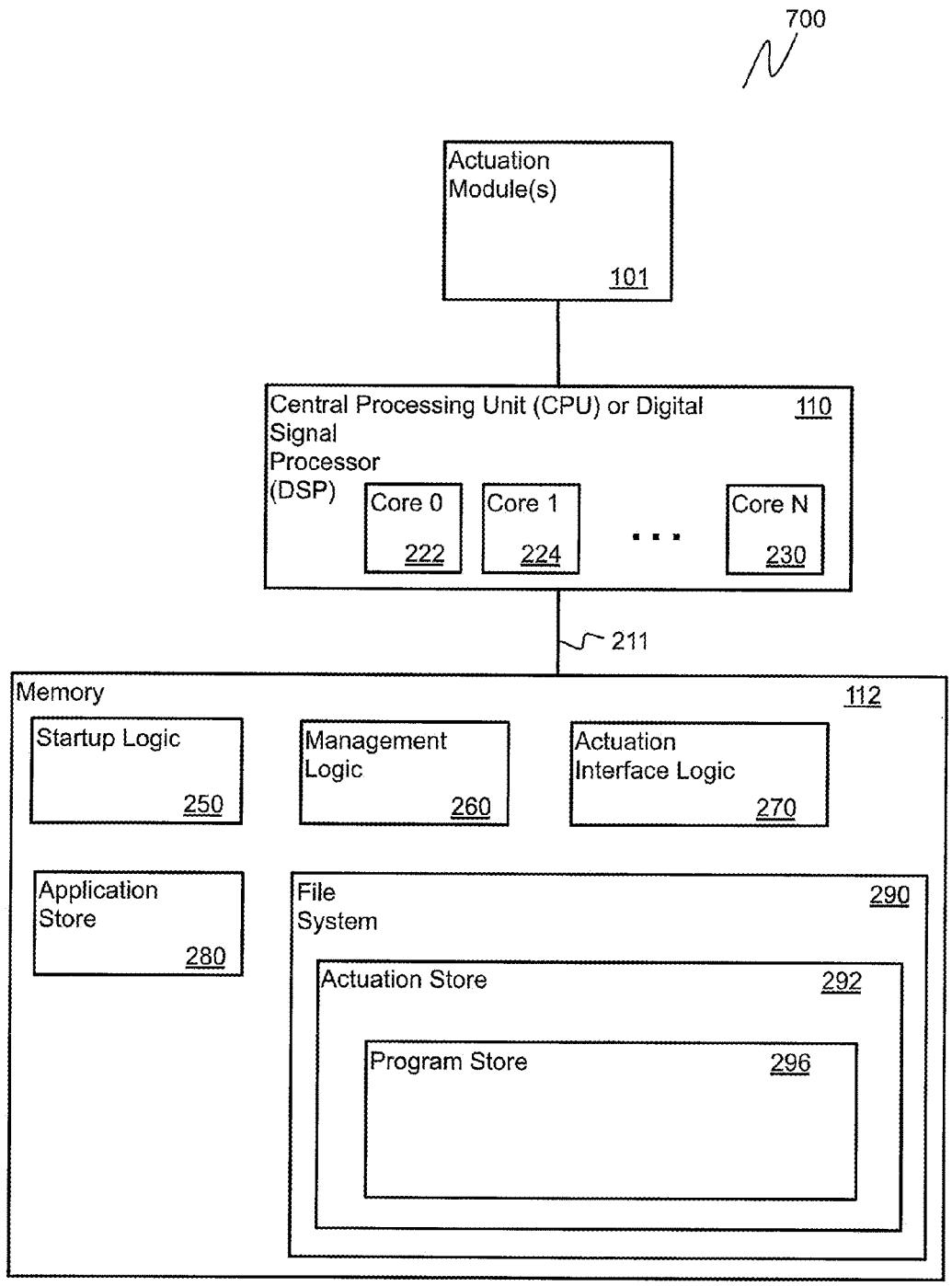
FIG. 12 is a schematic diagram illustrating an exemplary software architecture for remote control actuating embodiments.
Figure 13:
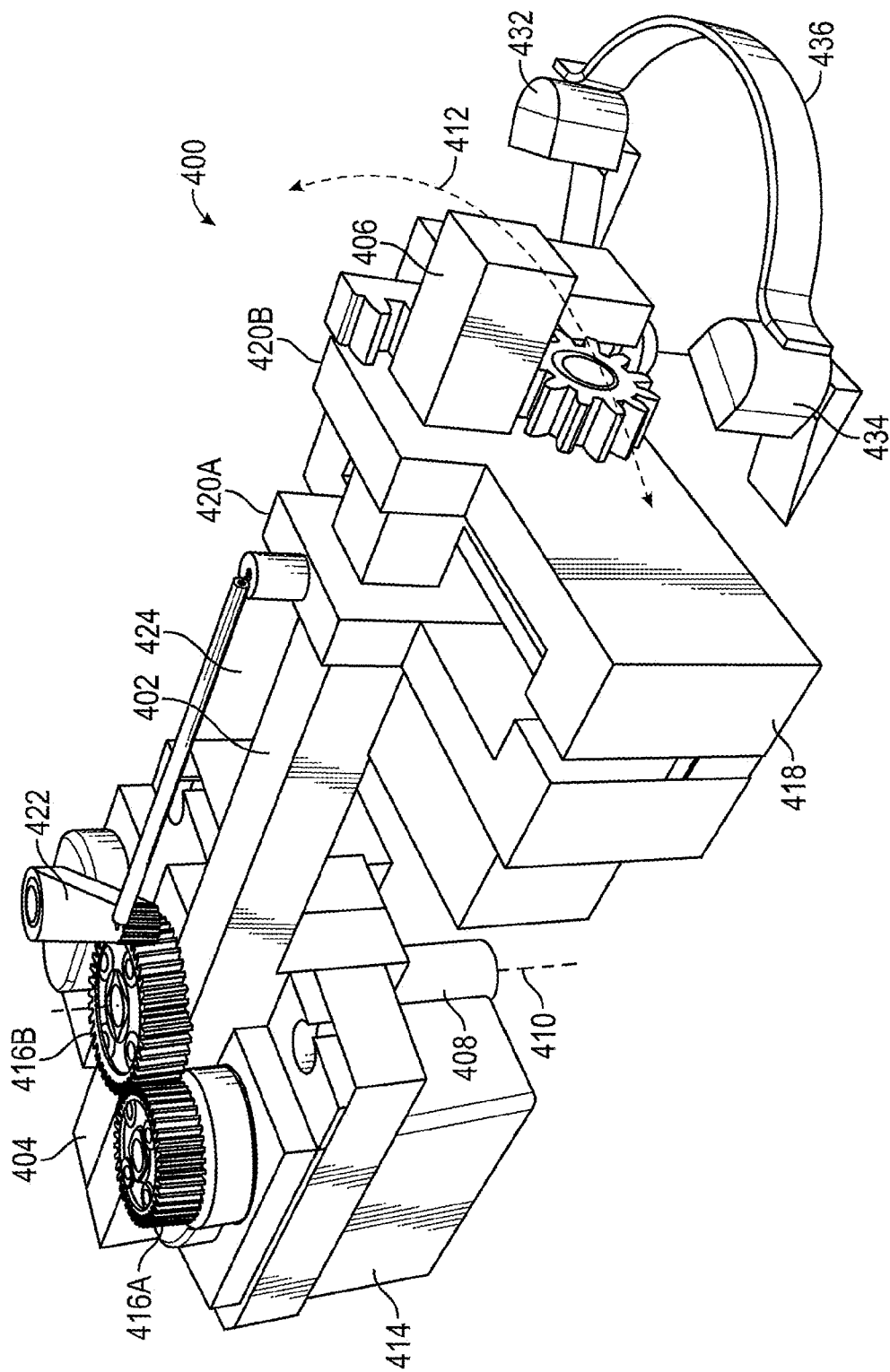
FIG. 13 is a left-side isometric view of an alternative embodiment of the remote button actuation system.
Figure 14:
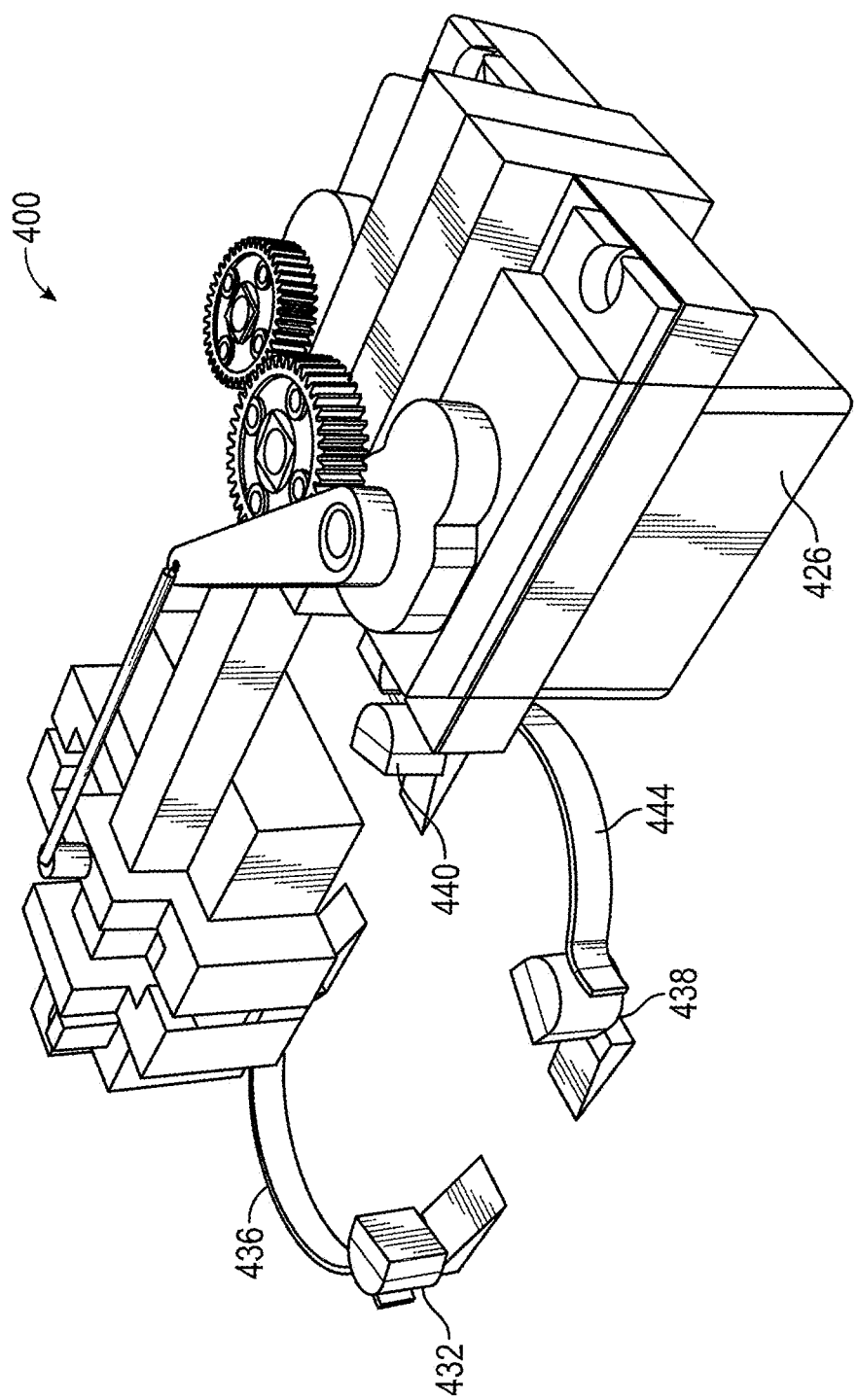
FIG. 14. is a right-side isometric view of an alternative embodiment of the remote button actuation system.
Figure 15:
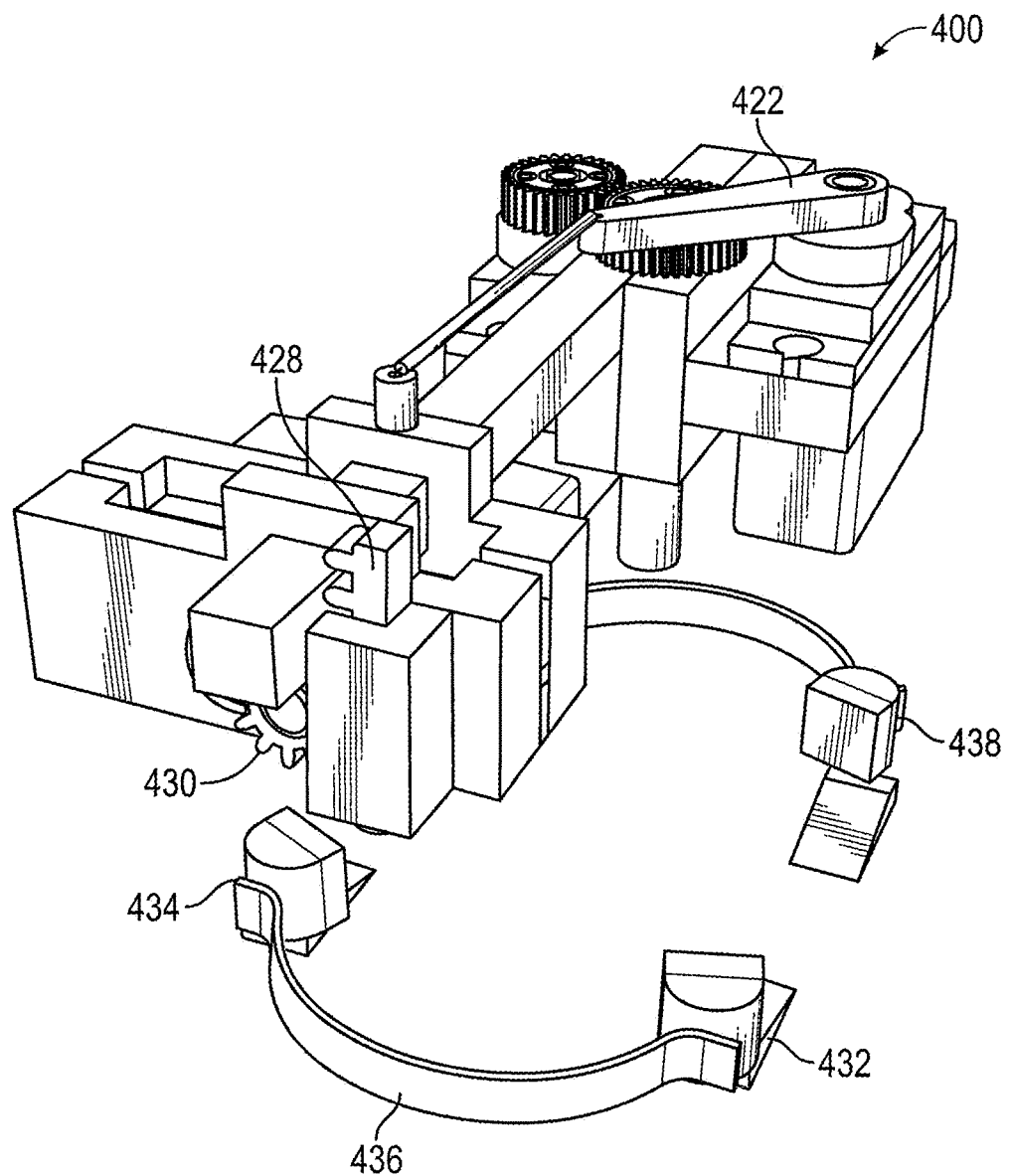
FIG. 15 is a front-side isometric view of an alternative embodiment of the remote button actuation system.
Figure 16:
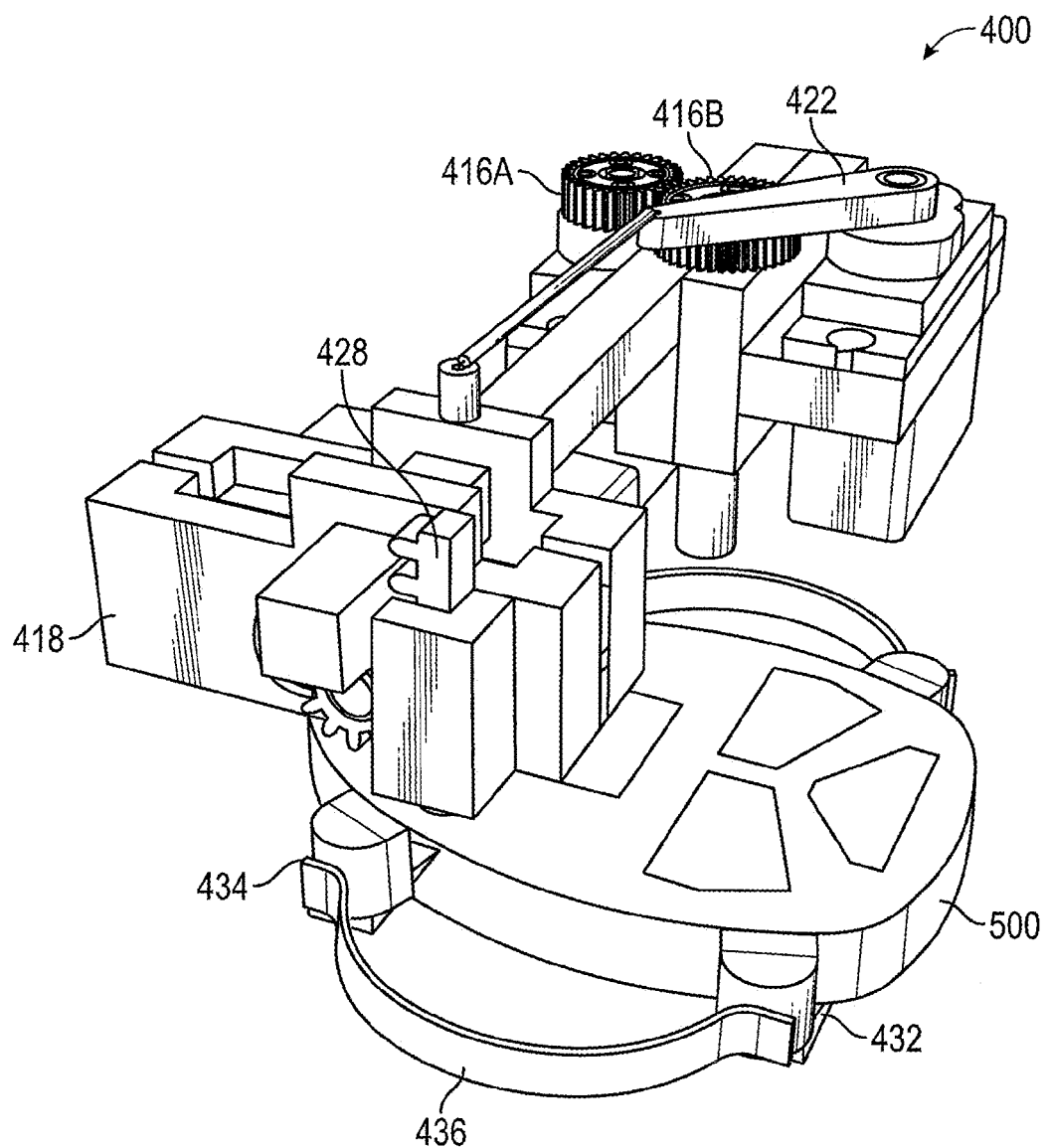
FIG. 16 is a front-side isometric view of an alternative embodiment of the remote button actuation system with a remote control positioned in an actuatable configuration.
Figure 17:
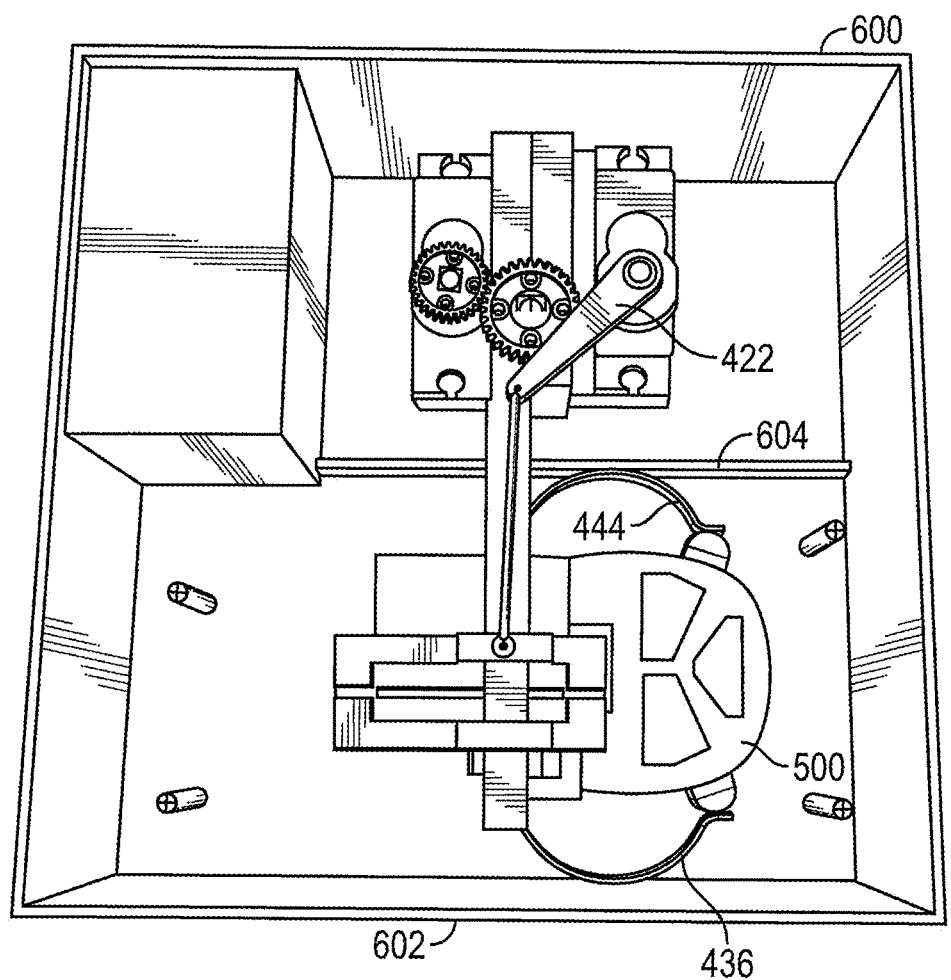
FIG. 17 is a top-view of the system and remote control of FIG. 16 enclosed in a box.

FIG. 12 is a functional block diagram illustrating an exemplary, non-limiting aspect of a portable computing device ("PCD"), such as a mobile component 850 and/or a actuation package 800, for implementing the disclosed methods and systems. The PCD may be in the form of a wireless telephone in some embodiments. As shown, the PCD 100, 125 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

Figure 11:
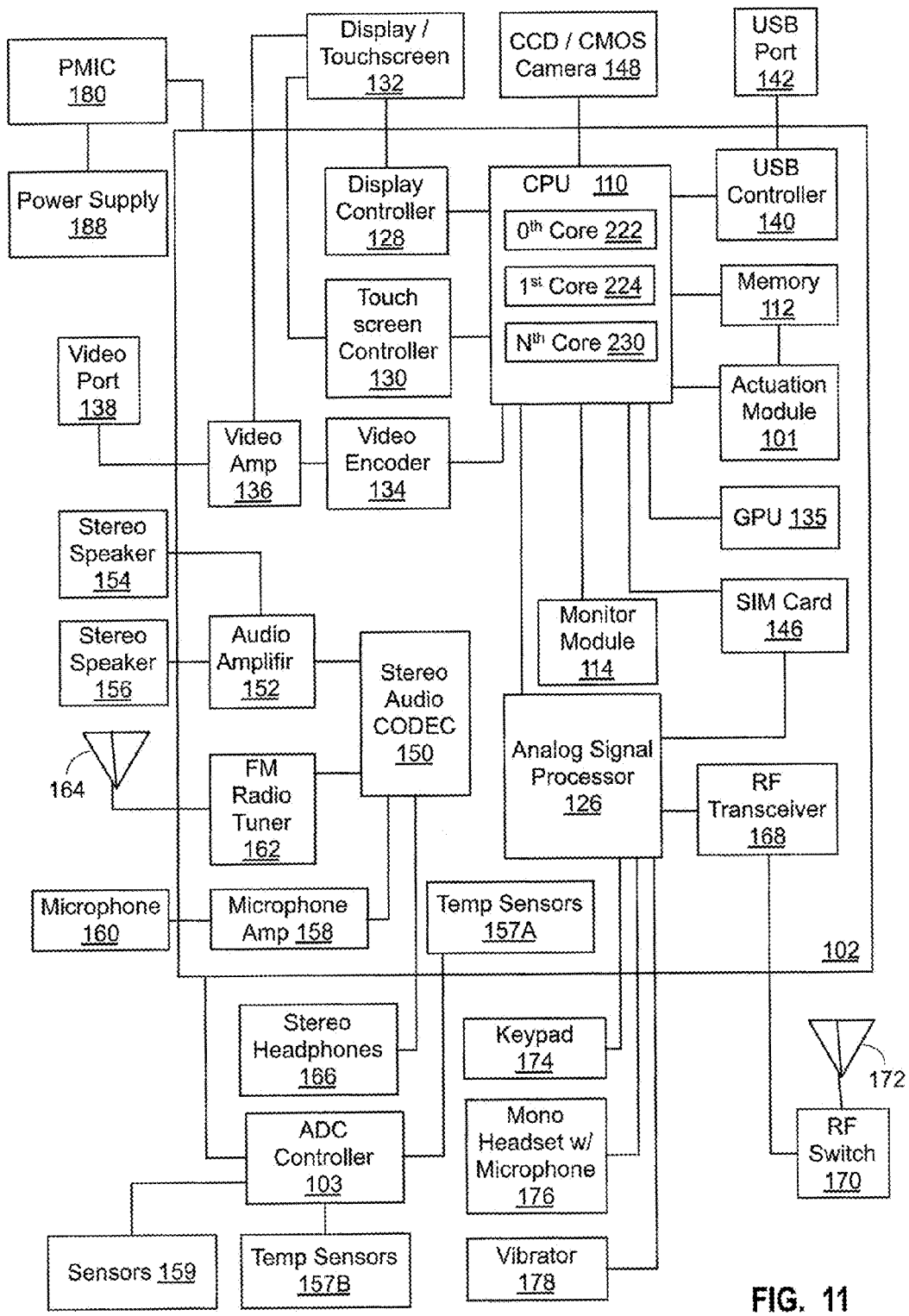
FIG. 11 is a functional block diagram illustrating an exemplary, non-limiting aspect of a portable computing device ("PCD") in the form of a wireless telephone for implementing the remote control actuation methods and systems.

As illustrated in FIG. 11, a display controller 128 and a touch screen controller 130 are coupled to the digital signal processor 110. A touch screen display 132 external to the on-chip system 102 is coupled to the display controller 128 and the touch screen controller 130. PCD 100, 125 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136. As depicted in FIG. 6, a universal serial bus ("USB") controller 140 is coupled to the CPU 110. Also, a USB port 142 is coupled to the USB controller 140. A memory 112, which may include a PoP memory, a cache 116, a mask ROM/Boot ROM, a boot OTP memory, a DDR memory 115 may also be coupled to the CPU 110. A subscriber identity module ("SIM") card 146 may also be coupled to the CPU 110. Further, as shown in FIG. 6, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 11, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 6 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 11 further indicates that a radio frequency ("RF") transceiver 168 may be coupled to the analog signal processor 126. An RF switch 170 may be coupled to the RF transceiver 168 and an RF antenna 172. As shown in FIG. 6, a keypad 174 may be coupled to the analog signal processor 126. Also, a mono headset with a microphone 176 may be coupled to the analog signal processor 126. Further, a vibrator device 178 may be coupled to the analog signal processor 126. FIG. 6 also shows that a power supply 188, for example a battery, is coupled to the on-chip system 102 through a power management integrated circuit ("PMIC") 180. In a particular aspect, the power supply 188 includes a rechargeable DC battery or a DC power supply that is derived from an alternating current ("AC") to DC transformer that is connected to an AC power source. In another particular aspect, the power supply 188 includes a kinetically rechargeable DC battery.

The CPU 110 may also be coupled to one or more internal, on-chip thermal sensors 157A as well as one or more external, off-chip thermal sensors 157B and physiological sensors 159. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller (not shown). However, other types of thermal sensors 157 may be employed.

FIG. 12 is a schematic diagram illustrating an exemplary software architecture 700 for the disclosed embodiments. As illustrated in FIG. 7, the CPU or digital signal processor 110 is coupled to the memory 112 via main bus 211. The memory 112 may reside within a mobile component 850, a actuation package 800 or a combination thereof. Similarly, it will be understood that the actuation module 101 and the CPU 110 may reside within a mobile component 850, a actuation package 800 or a combination thereof.

The CPU 110, as noted above, is a multiple-core processor having N core processors. That is, the CPU 110 includes a first core 222, a second core 224, and an Nth core 230. As is known to one of ordinary skill in the art, each of the first core 222, the second core 224 and the Nth core 230 are available for supporting a dedicated application or program. Alternatively, one or more applications or programs may be distributed for processing across two or more of the available cores.

The CPU 110 may receive commands from the actuation module(s) 101 that may comprise software and/or hardware. If embodied as software, the module(s) 101 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the Nth core 230 via one or more shared caches and they may implement message or instruction passing via network topologies such as bus, ring, mesh and crossbar topologies.

Bus 211 may include multiple communication paths via one or more wired or wireless connections, as is known in the art and described above in the definitions. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD (e.g., actuation component/mobile component) 800/850 is implemented in software, as is shown in FIG. 12, it should be noted that one or more of startup logic 250, management logic 260, actuation interface logic 270, applications in application store 280 and portions of the file system 290 may be stored on any computer-readable medium for use by, or in connection with, any computer-related system or method. In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), Flash, and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

In an alternative embodiment, where one or more of the startup logic 250, management logic 260 and perhaps the actuation interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for actuation of the remote control of a vehicle. The startup logic 250 may identify, load and execute an actuation program. An exemplary select program may be found in the program store 296 of the embedded file system 290. The exemplary select program, when executed by one or more of the core processors in the CPU 110 may operate in accordance with one or more signals provided by the actuation module 101 to start the program.

The management logic 260 includes one or more executable instructions for terminating a program on one or more of the respective processor cores, as well as selectively identifying, loading, and executing a more suitable replacement program. The management logic 260 is arranged to perform these functions at run time or while the PCD 100 is powered and in use by an operator of the device. A replacement program, which may be customized by a user in some embodiments, may be found in the program store 296 of the embedded file system 290.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260.

The interface logic 270 enables a manufacturer to controllably configure and adjust an end user's experience under defined operating conditions on the PCD 800/850. When the memory 112 is a flash memory, one or more of the startup logic 250, the management logic 260, the interface logic 270, the application programs in the application store 280 or information in the embedded file system 290 may be edited, replaced, or otherwise modified. In some embodiments, the interface logic 270 may permit an end user or operator of the PCD 800/850 to search, locate, modify or replace the startup logic 250, the management logic 260, applications in the application store 280 and information in the embedded file system 290. The operator may use the resulting interface to make changes that will be implemented upon the next startup of the PCD 800/850. Alternatively, the operator may use the resulting interface to make changes that are implemented during run time.

The embedded file system 290 includes a hierarchically arranged actuation store 292. In this regard, the file system 290 may include a reserved section of its total file system capacity for the storage of information for the configuration and management of the various algorithms used by the PCD 800/850.

Systems, devices and methods for the remote actuation system have been described using detailed descriptions of embodiments thereof that are provided by way of example and are not intended to limit the scope of the disclosure. The described embodiments comprise different features, not all of which are required in all embodiments of a remote actuation system. Some embodiments of a remote actuation system utilize only some of the features or possible combinations of the features. Variations of embodiments of a remote actuation system that are described and embodiments of a remote actuation system comprising different combinations of features noted in the described embodiments will occur to persons of the art.

It will be appreciated by persons skilled in the art that systems, devices and methods for the provision of remote actuation system is not limited by what has been particularly shown and described herein above. Rather, the scope of systems, devices and methods for the provision of remote actuation system is defined by the claims that follow.

Certain steps in the processes or process flows described in this specification naturally precede others for the description to function as described. However, the description is not limited to the order of the steps described if such order or sequence does not alter the functionality of the description. That is, it is recognized that some steps may performed before, after, or parallel (substantially simultaneously with) other steps without departing from the scope and spirit of the description. In some instances, certain steps may be omitted or not performed without departing from the description. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed description without difficulty based on the flow charts and associated description in this specification, for example.

Therefore, disclosure of a particular set of program code instructions or detailed hardware devices is not considered necessary for an adequate understanding of how to make and use the description. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present description, as defined by the following claims.

Figure 18:
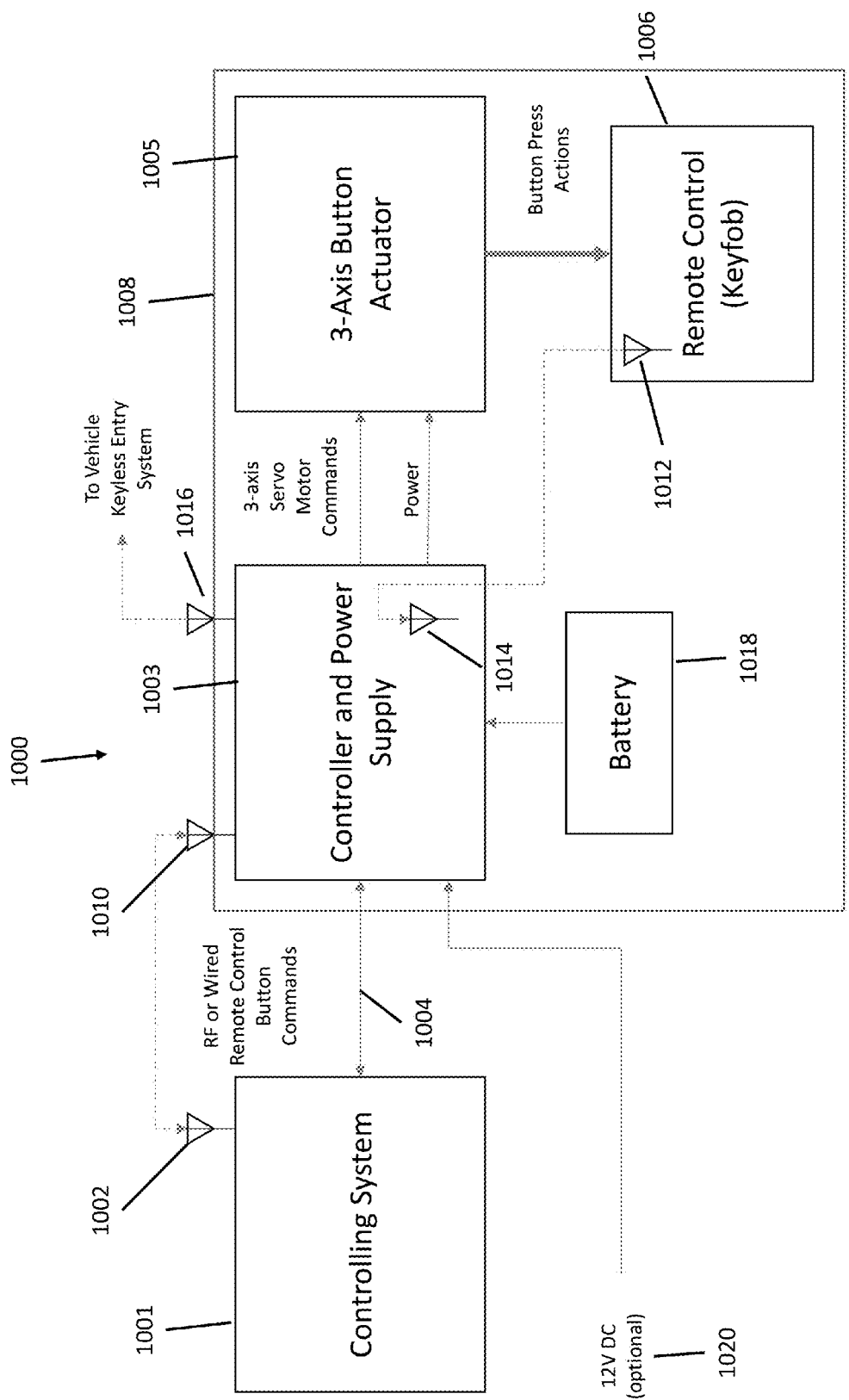
FIG. 18 is a mechanization diagram showing exemplary components of a second embodiment of the remote button actuation system.

FIG. 18 illustrates a mechanization diagram of the remote control button actuation system 1000 in accordance with another contemplated embodiment of the present disclosure. In the embodiment shown in FIG. 18, the controlling system 1001 may again be a mobile device which operates to send user commands via wireless RF through antenna 1002 or other wireless technology, including optical and audible technology, to the controller 1003. Alternatively, the controlling system 1001 could communicate to the controller 1003 through a wired connection, such as shown by reference numeral 1004. As in the previous embodiment, the controller 1003 converts commands received from the mobile device 1001 into specific servo motor commands that cause the provision of actuating power to the three-axis button actuator 1005, which then presses the selected remote control button on a remote control device, such as a key fob 1006. Although a key fob 1006 is shown in the drawing figures, the remote control device could be any other type of RF remote, such as a home security remote, a garage door remote or other types of remote control devices. In the embodiment illustrated in FIG. 18, the controller 1003, actuator 1005 and key fob 1006 are all contained within an isolation enclosure 1008. The isolation enclosure 1008 is contemplated as being constructed of metal or a metalized material that will completely block RF transmissions into and out of the isolation enclosure 1008. The isolation enclosure 1008 will be designed as a Faraday cage to limit the RF communications into and out of the isolation enclosure 1008.

As illustrated in FIG. 18, a receiving antenna 1010 receives control commands from the controlling system 1001. The receiving antenna 1010 is aligned with an opening or other area of the isolation enclosure 1008 that allows RF signals to be received from within the isolation enclosure 1008. Alternatively, the receiving antenna 1010 could be located outside of the isolation enclosure 1008 and connected by a wire to the controller 1003. The receiving antenna 1010 is used by the controller 1003 to receive wireless commands from the controlling system 1001. It is contemplated that the receiving antenna 1010 could be a Bluetooth or other short-range antenna that is able to communicate with the controlling system 1001, such as a mobile device.

When the controller 1003 receives the command from the controlling system 1001, the controller 1003 generates motor commands which are relayed to the actuator 1005. The actuator 1005 converts the commands to actuate a series of servo motors, which cause an actuator tip of the actuator 1005 to press one or more buttons on the key fob 1006.

In a contemplated, alternate embodiment the controller 1003 could includes a separate cellular transceiver (not shown) that would allow the controller 1003 to receive commands directly from a cellular network, from either the controlling system 1001 or from a remote server. The use of a separate cellular transceiver would extend the range of the controlling system 1001 as compared to the relatively short range transceivers (i.e. Bluetooth). In this manner, the cellular transceiver would extend the communication range of the controlling system 1001, which in many cases will be a smart phone.

When the key fob button is pressed, the key fob generates an RF vehicle command signal from the internal key fob antenna 1012 in a conventional manner. Since the key fob 1006 is contained within the enclosure 1008, the command signal sent from the key fob antenna 1012 is isolated and is not directly received by the operating components within the vehicle.

Controller 1003 includes a receiving antenna 1014 that receives the RF vehicle command signal from the key fob 1006. The controller 1003 can be programmed and configured to either retransmit the command signal received from the key fob 1006 or to amplify the command signal depending upon the desired range. The controller 1003 is connected to a transmitting antenna 1016. Like the receiving antenna 1010, the transmitting antenna 1016 is aligned with an opening or other area of the isolation enclosure 1008 that allows RF signals to be transmitted from within the isolation enclosure 1008. Alternatively, the transmitting antenna 1016 could be located outside of the isolation enclosure 1008 and connected by a wire to the controller 1003. The transmitting antenna 1016 is positioned such that the controller is able to transmit RF vehicle command signals out of the enclosure 1008 for receipt by the vehicle's keyless entry and/or keyless ignition system. As can be understood in FIG. 18, the use of the receiving antenna 1010 and transmitting antenna 1016 allows the controller 1003 to communicate outside of the enclosure 1008. Since the enclosure 1008 is designed to block RF transmissions, the use of the two antennas 1010 and 1016 allows the actuation system 1000 to isolate the key fob 1006.

In the embodiment shown in FIG. 18, the controller 1003 is powered by an internal battery 1018. However, it is contemplated that the controller 1003 could also receive power from a 12-volt DC power source 1020, such as a vehicle battery.

Since the entire remote control button actuation system 1000 shown in FIG. 18 is self-contained, the actuation system 1000 could be located at various different locations within a vehicle as long as the transmissions from the transmitting antenna 1016 are strong enough to reach the vehicle's keyless entry and keyless starting systems.

The actuator 1005 shown in FIG. 18 could be either the embodiment shown previously in the present application or could be one of the two alternate embodiments to be shown in FIGS. 19-30. In each case, the actuator 1005 is contained within the enclosure 1008 and used to press the required and desired button on the remote control key fob 1006. Although the present disclosure contemplates the remote control as being a key fob 1006, it should be understood other types of remote control systems could be utilized while operating within the scope of the present disclosure.

Figure 19:
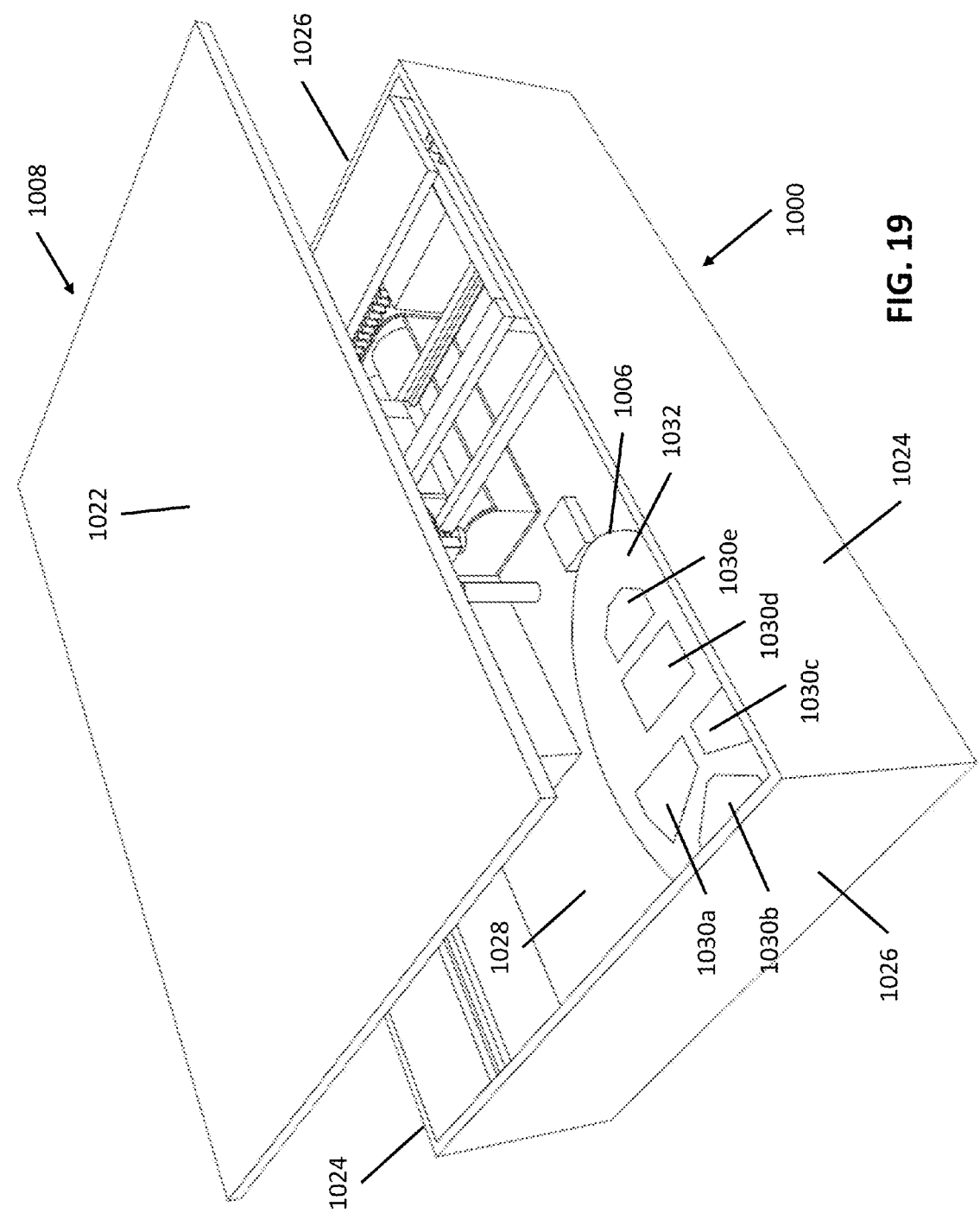
FIG. 19 is a perspective view of the self-contained remote button actuation system.

FIG. 19 illustrates one embodiment of the remote control actuation system 1000. In the embodiment shown in FIG. 19, the enclosure 1008 includes a top cover 1022, a pair of side walls 1024, a pair of end walls 1026 and a bottom wall 1028. As described previously, the enclosure 1008 is preferably formed from a metal or metalized material that completely blocks RF transmissions. In the embodiment shown in FIG. 19, a key fob 1006 is shown positioned within the enclosure. The key fob shown in FIG. 19 includes five separate buttons 1030A-1030E each located on the top face 1032 of the key fob 1006. Each of the buttons 1030A-1030E performs a different function.

Figure 20:
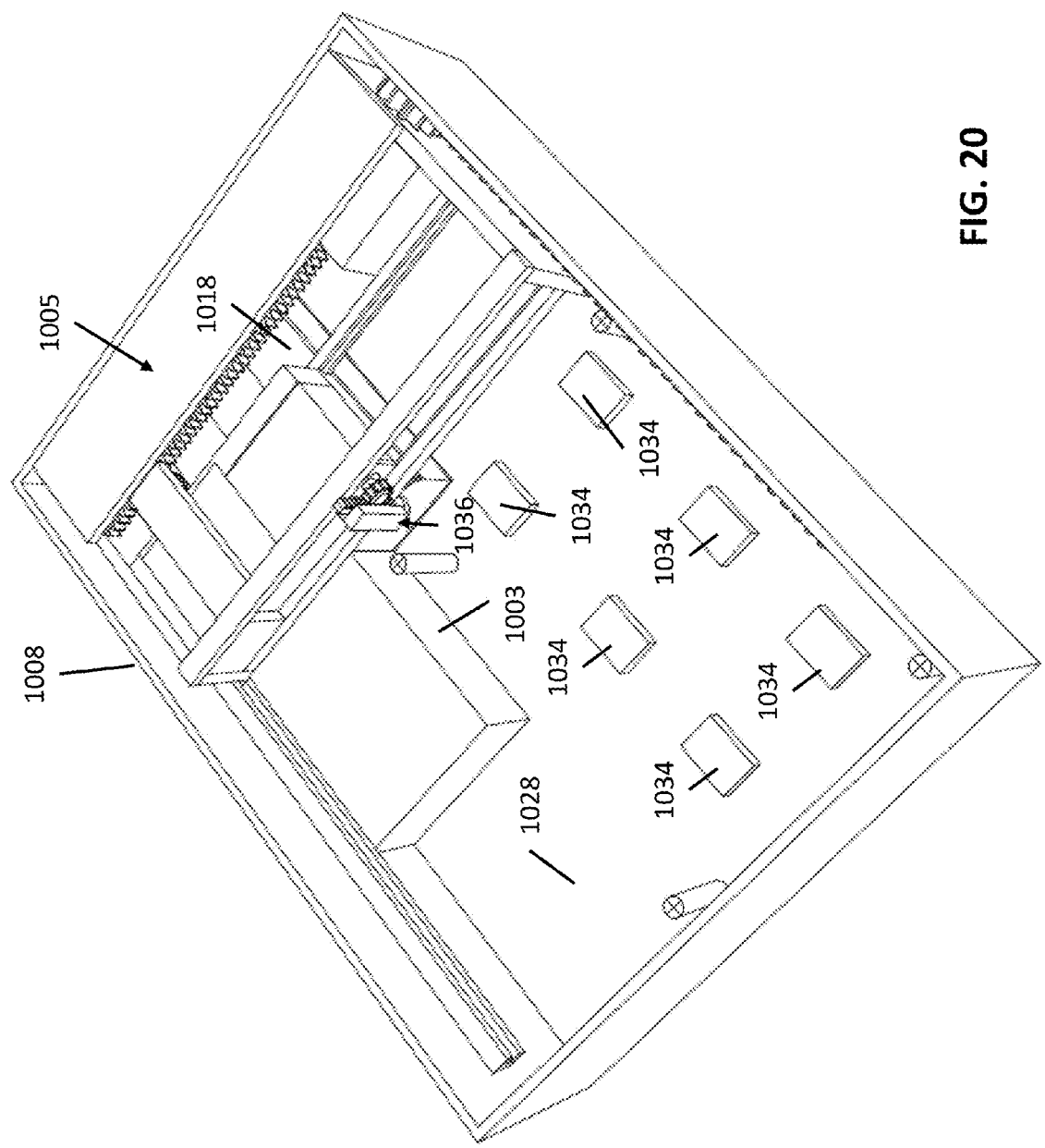
FIG. 20 is a top perspective view of the remote button actuation system.
Figure 21:
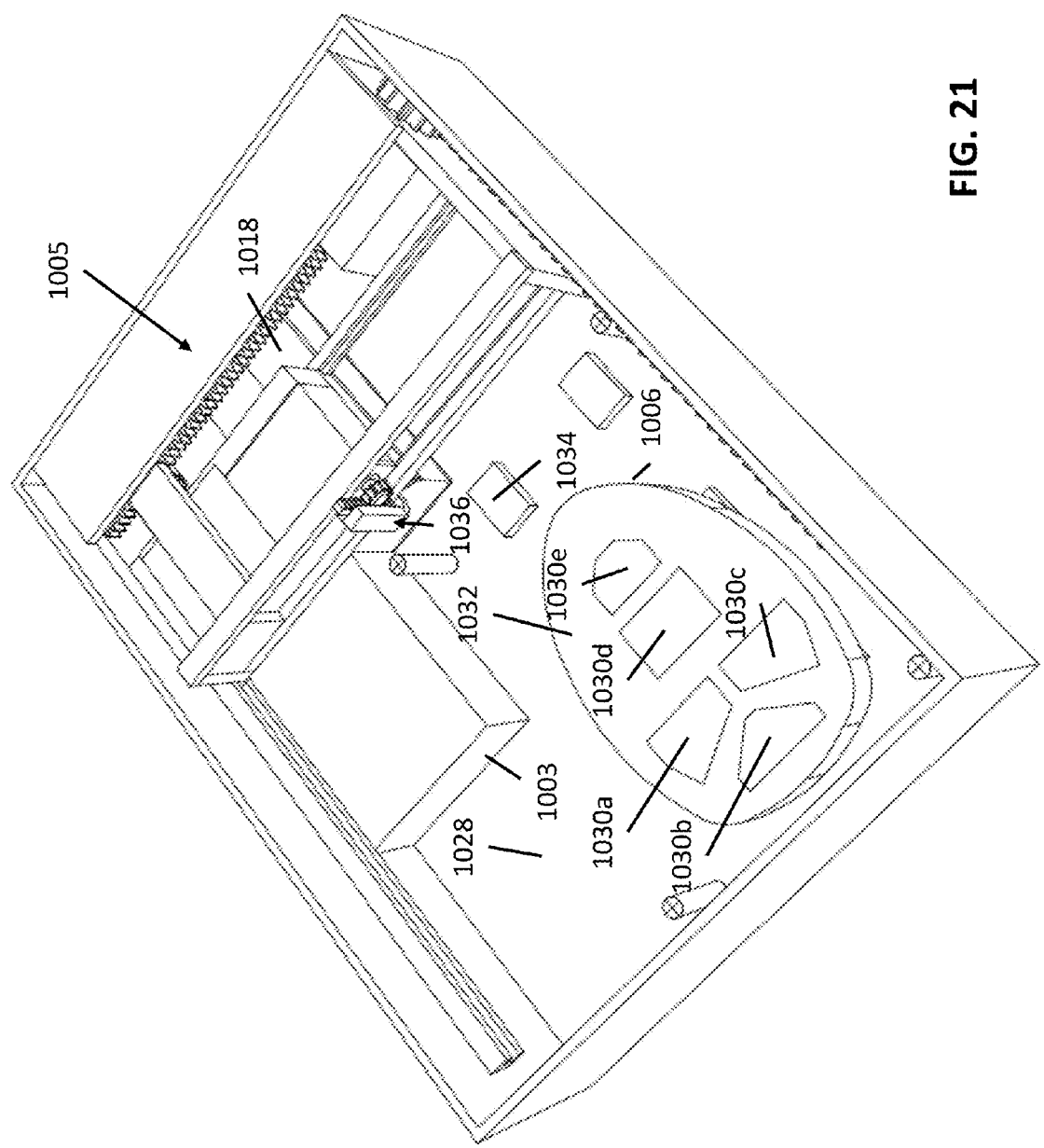
FIG. 21 is a top perspective view similar to FIG. 20 with a key fob in position.

Referring now the FIG. 20, the bottom wall 1028 includes a remote control support. In the embodiment shown, the remote control support includes a series of support pads 1034. In the preferred embodiment, the support pads 1034 are formed from an adhesive putty that includes a tackified surface that contacts a bottom face of the key fob 1006 to hold the key fob in position, as best shown in FIG. 21. The adhesive putty can deform to accommodate the irregular shape of the key fob or any other type of remote control device, which maximizes the adhesive contact and enables leveling of the remote control button face within the enclosure. When in position as shown in FIG. 21, each of the buttons 1030A-1030E on the top face 1032 is accessible and presented in a generally level orientation.

As shown in FIGS. 20 and 21, the enclosure 1008 surrounds the controller 1003, the battery 1018 and the button actuator 1005. The button actuator 1005 is operable to move a plunger 1036 to depress any one of the series of buttons 1030A-1030E.

Figure 23:
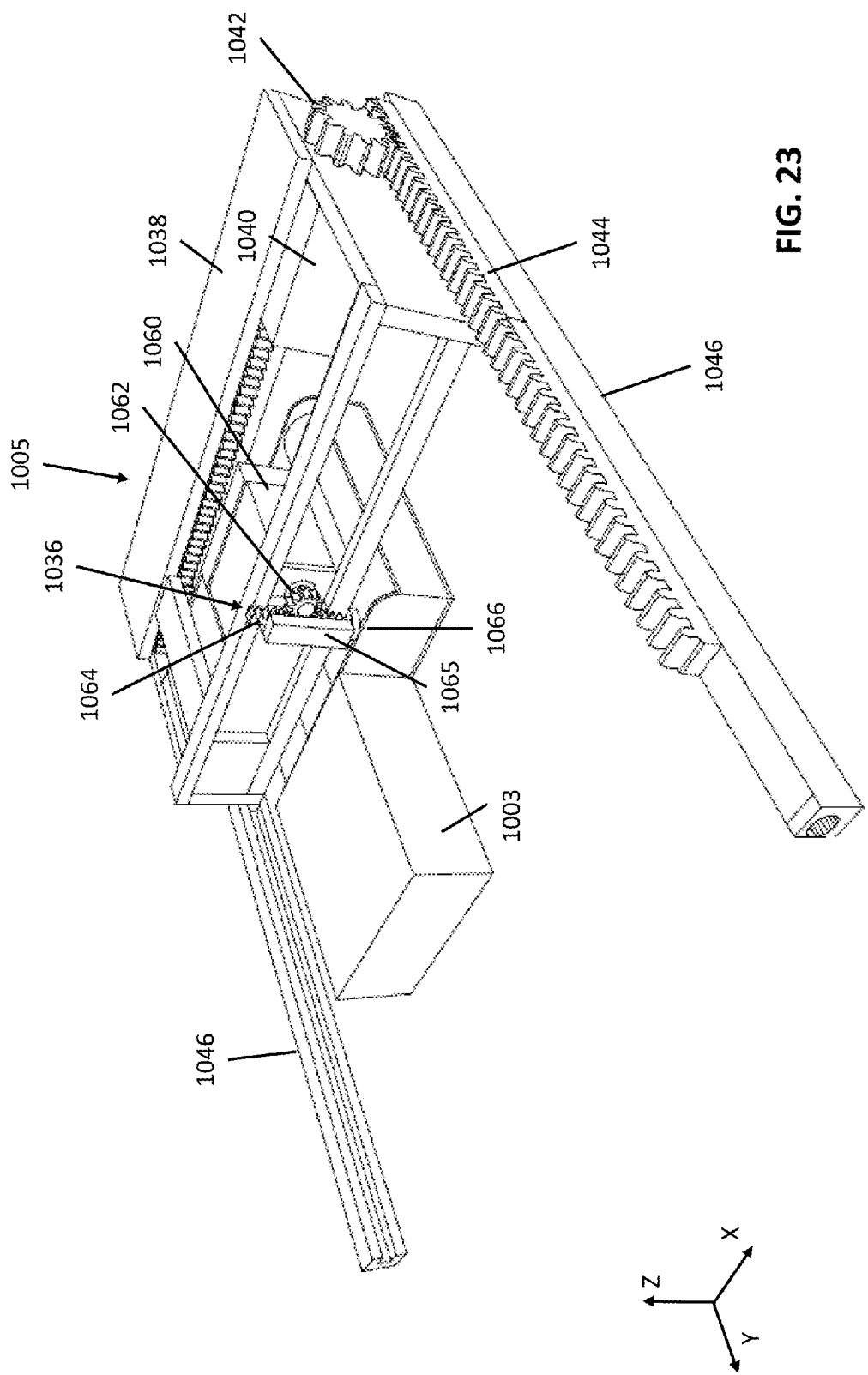
FIG. 23 is a top perspective view of the three-axis actuator removed from the enclosure.

Referring now to FIG. 23, the actuator 1005 is shown in isolation and removed from the enclosure. The actuator 1005 receives commands from the controller 1003 to move the plunger 1036 into a desired location. The actuator 1005 is able to move the plunger 1036 in three different axes, defined as the x, y and z axes in FIG. 23. The actuator 1005 includes an outer frame 1038 that encases the entire robotic system. The outer frame 1038 supports a first servo motor 1040. The first servo motor 1040 operates to drive a pinion gear 1042 that engages a long rack gear 1044 supported along a support rail 1046. When the servo motor 1040 rotates, the interaction between the pinion gear 1042 and rack gear 1044 allows the entire outer frame 1038 to move along the pair of spaced support rails 1046. In this manner, the plunger 1036 can move along the y-axis.

Figure 24:
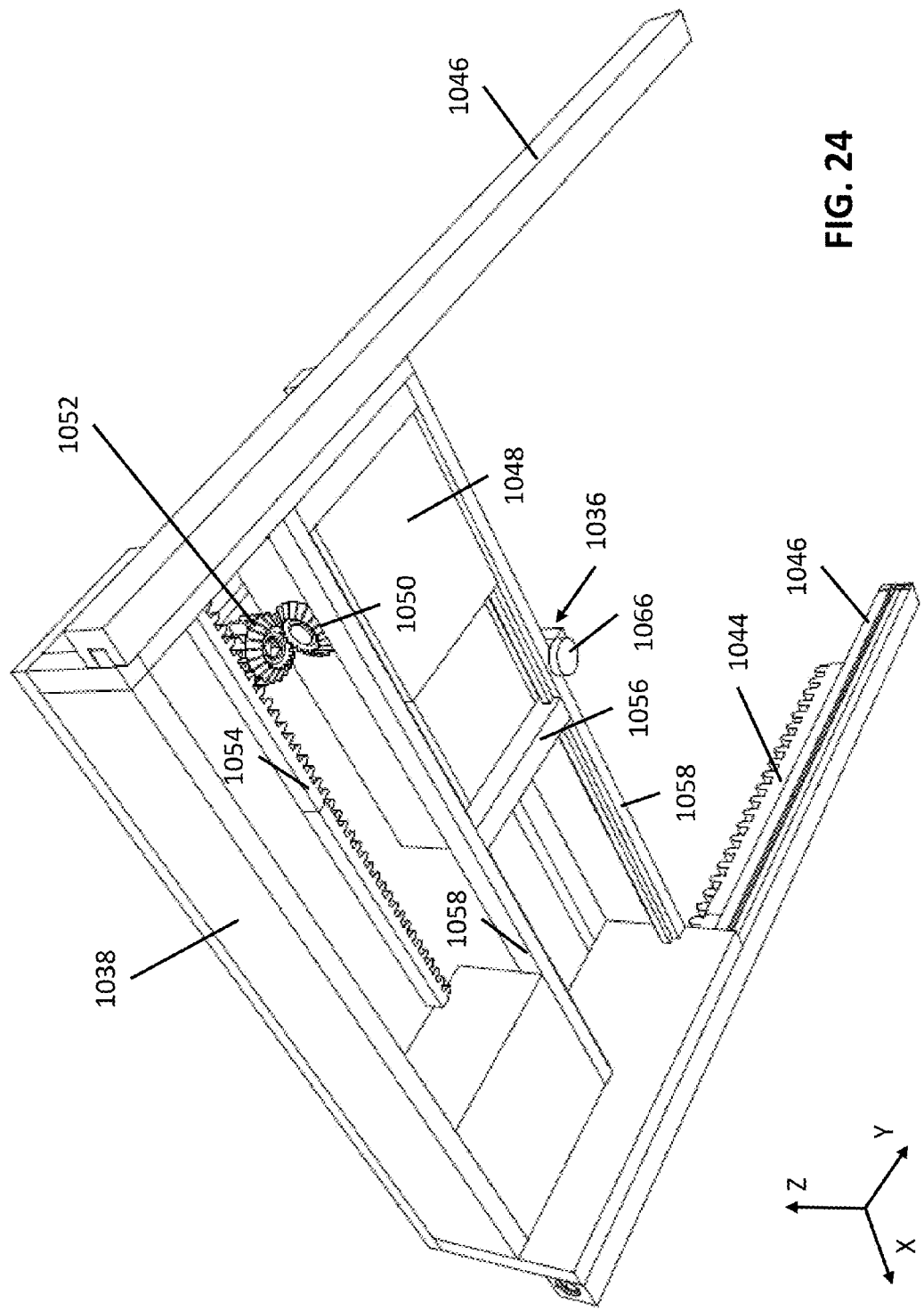
FIG. 24 is a bottom perspective view of the three-axis actuator.

Referring now to FIG. 24, a second servo motor 1048 is supported on the inner frame 1056 that is movable within the outer frame 1038. The second servo motor 1048 is operable to rotate a first bevel gear 1050 which in turn meshes with a second bevel gear 1052. The second bevel gear 1052 includes a series of teeth that mesh with a second rack gear 1054. In this manner, the second servo motor 1048 can be activated to move the inner frame 1056 along the pair of spaced support rails 1058. Thus, the second servo motor 1048 is operable to move the plunger 1036 along the x-axis.

Referring back to FIG. 23, a third servo motor 1060 is connected to a pinion gear 1062 that engages a rack gear 1064 that is movable along a support guide 1065. The rack gear 1064 includes an actuation tip 1066 that combines with the rack gear 1064 to form an actuation plunger 1036. When the third servo motor 1060 rotates, the interaction between the pinion gear 1062 and rack gear 1064 moves the plunger 1036 along the z-axis. As illustrated in FIG. 23, the lowermost portion of the rack gear 1064 of the plunger 1036 includes the actuation tip 1066. The actuation tip 1066 is designed of a specific size such that the actuation tip 1066 can depress any one of the buttons 1030 formed on the key fob.

Figure 25:
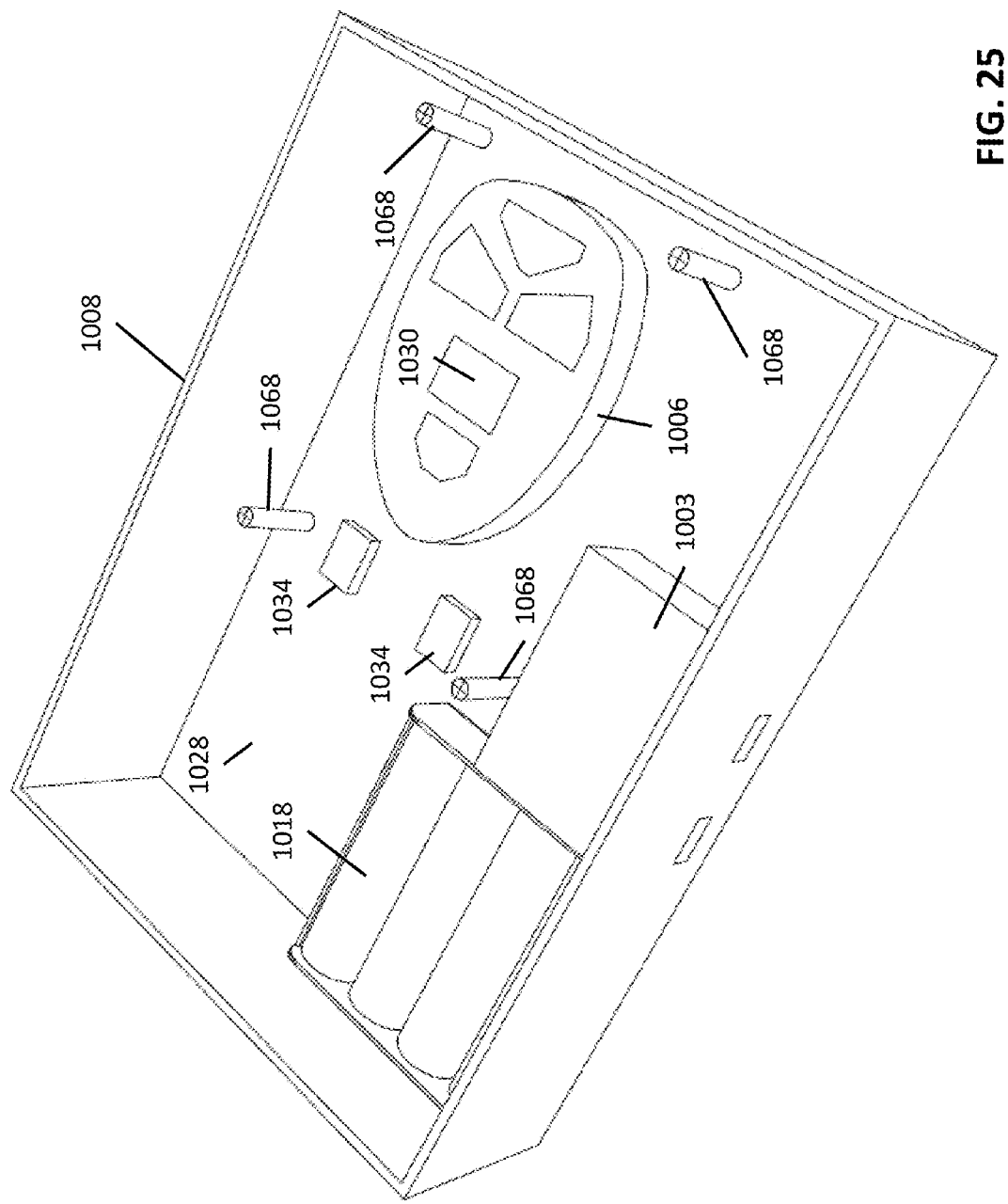
FIG. 25 is a top perspective view with the actuator removed.

As illustrated in FIG. 25, the battery 1018 is positioned within the enclosure 1008 to power the controller 1003. It is contemplated that a battery access panel (not shown) would be formed in the bottom wall 1028 of the enclosure 1008 to provide access for the batteries 1018 for initial installation and removal when discharged.

The enclosure 1008 includes four optical reference posts 1068 that protrude from the bottom wall 1028 at locations surrounding the key fob 1006. The reference posts 1068 will be used for calibrating the location of the key fob 1006 and the individual buttons 1030 within the enclosure 1008. During calibration, the correct z-axis location of each button is determined by automatically lowering the actuation tip until the key fob begins transmitting an RF signal, which is detected by the controller 1003. In the embodiment described in FIGS. 19-21, the key fob 1006 includes buttons 1030 only on the top face 1032. However, it is contemplated that the key fob could have buttons on either the side or bottom face.

Figure 22:
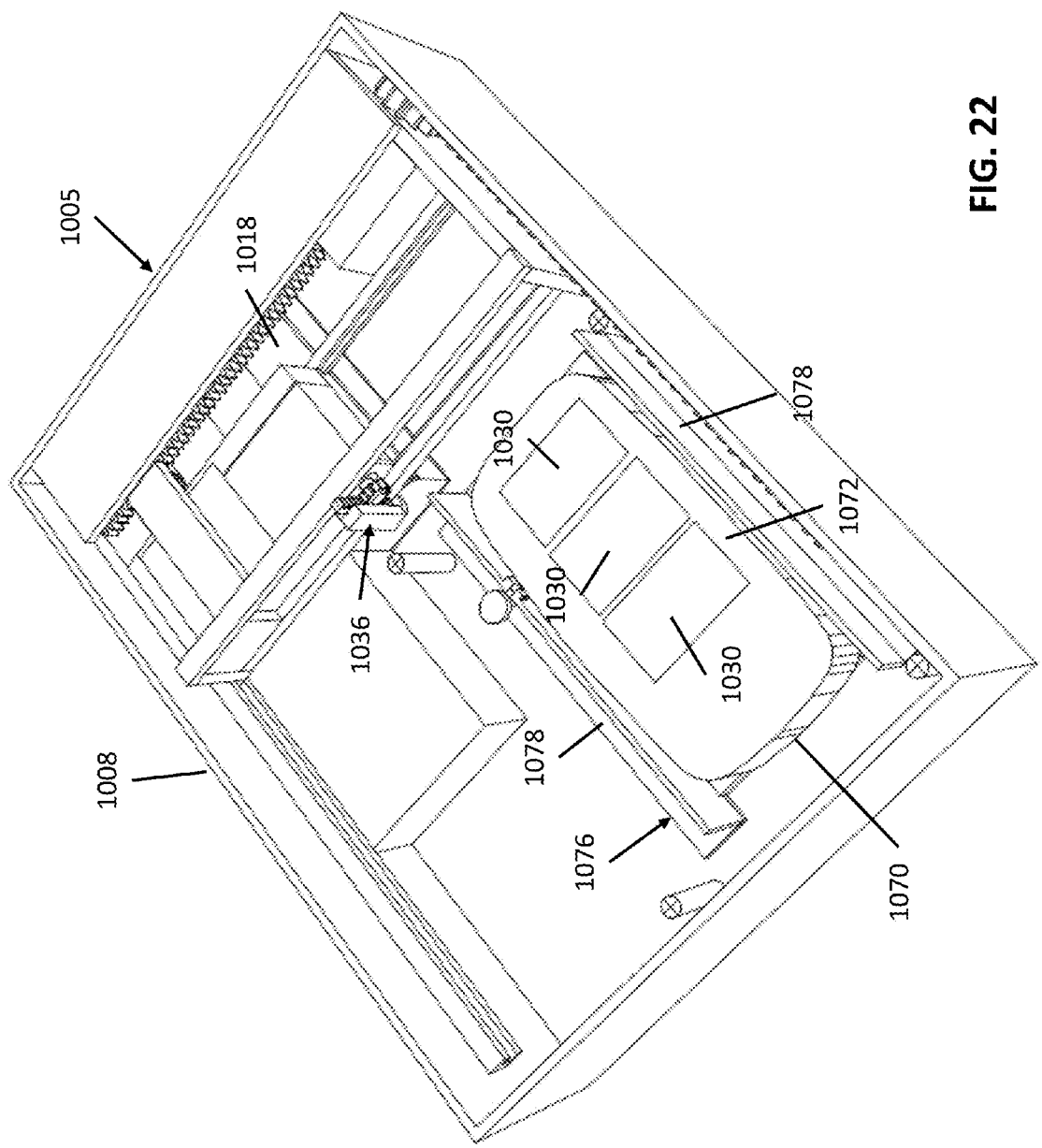
FIG. 22 is an alternate embodiment of the remote button actuation system including an alternate key fob.
Figure 26:
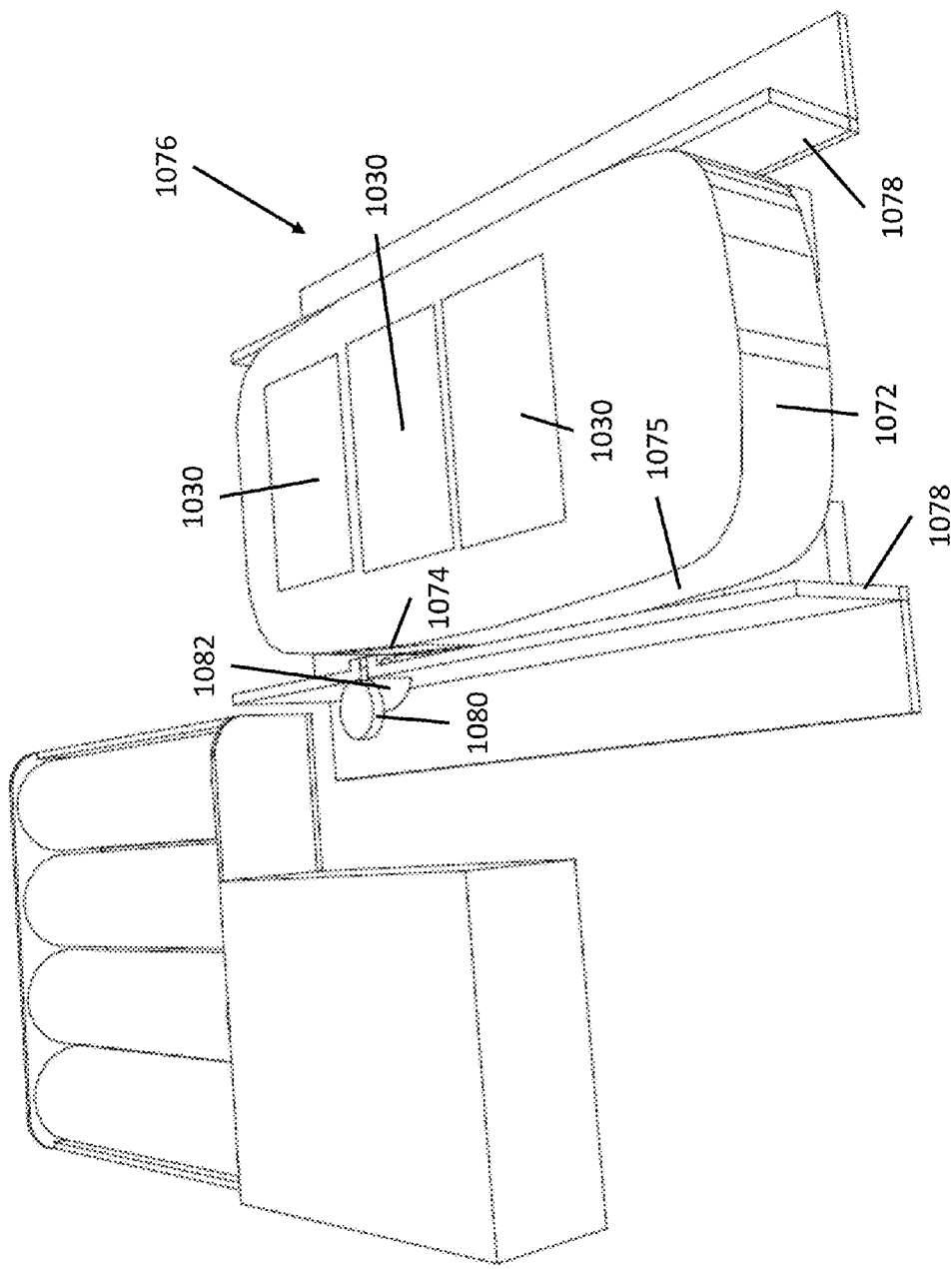
FIG. 26 is a perspective illustration of the alternate embodiment shown in FIG. 22.

The embodiment of the key fob 1070 shown in FIG. 22 includes additional actuating components that allow the actuator 1005 to depress buttons on either the side or back face of the key fob 1070. In the key fob 1070, actuation buttons 1030 are on the front face 1072. However, the key fob 1070 includes an additional side button 1074 as shown in FIG. 26 and a rear panic button 1077, as shown in FIG. 30.

Figure 27:
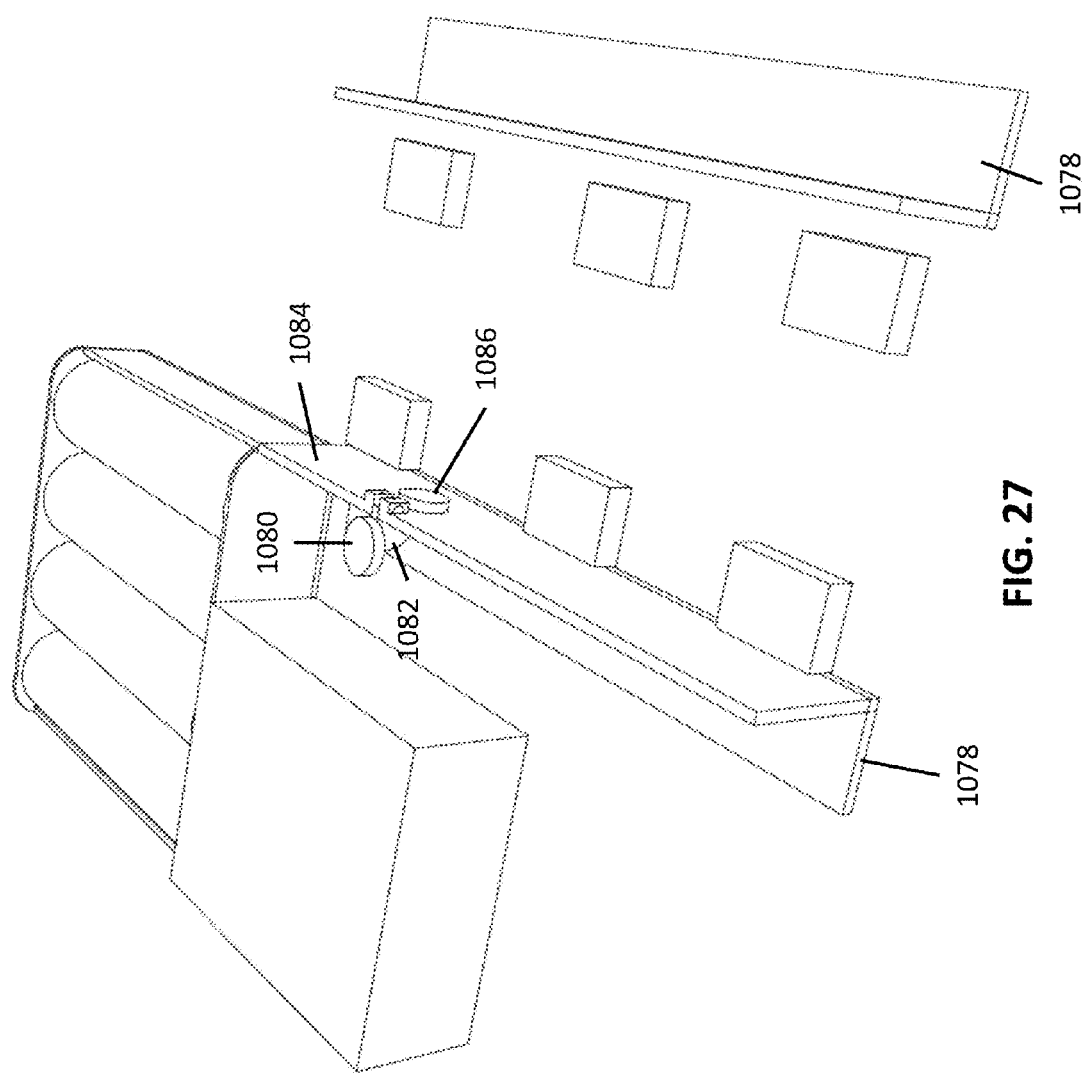
FIG. 27 is a view similar to FIG. 26 with the key fob removed.

Referring back to FIG. 22, since the plunger 1036 only moves in the z direction, the actuator 1005 includes a translation frame 1076 mounted within the enclosure 1008. The translation frame 1076 includes a pair of spaced side frames 1078 that are positioned on opposite sides of the key fob 1072. As shown in FIG. 27, one of the side frames 1078 includes a contact pad 1080 that is formed as part of a pivot arm 1082. The pivot arm 1082 is pivotally connected to the vertical wall 1084 such that downward force on the contact pad 1080 causes the pivot arm to rotate, resulting in movement of a second contact pad 1086 in a perpendicular direction. As can be understood in the comparisons of FIGS. 26 and 27, the downward movement of the contact pad 1080 causes the horizontal movement of the contact pad 1086 into contact with the button 1074 formed on the side 1075 of the key fob 1072.

Figure 28:
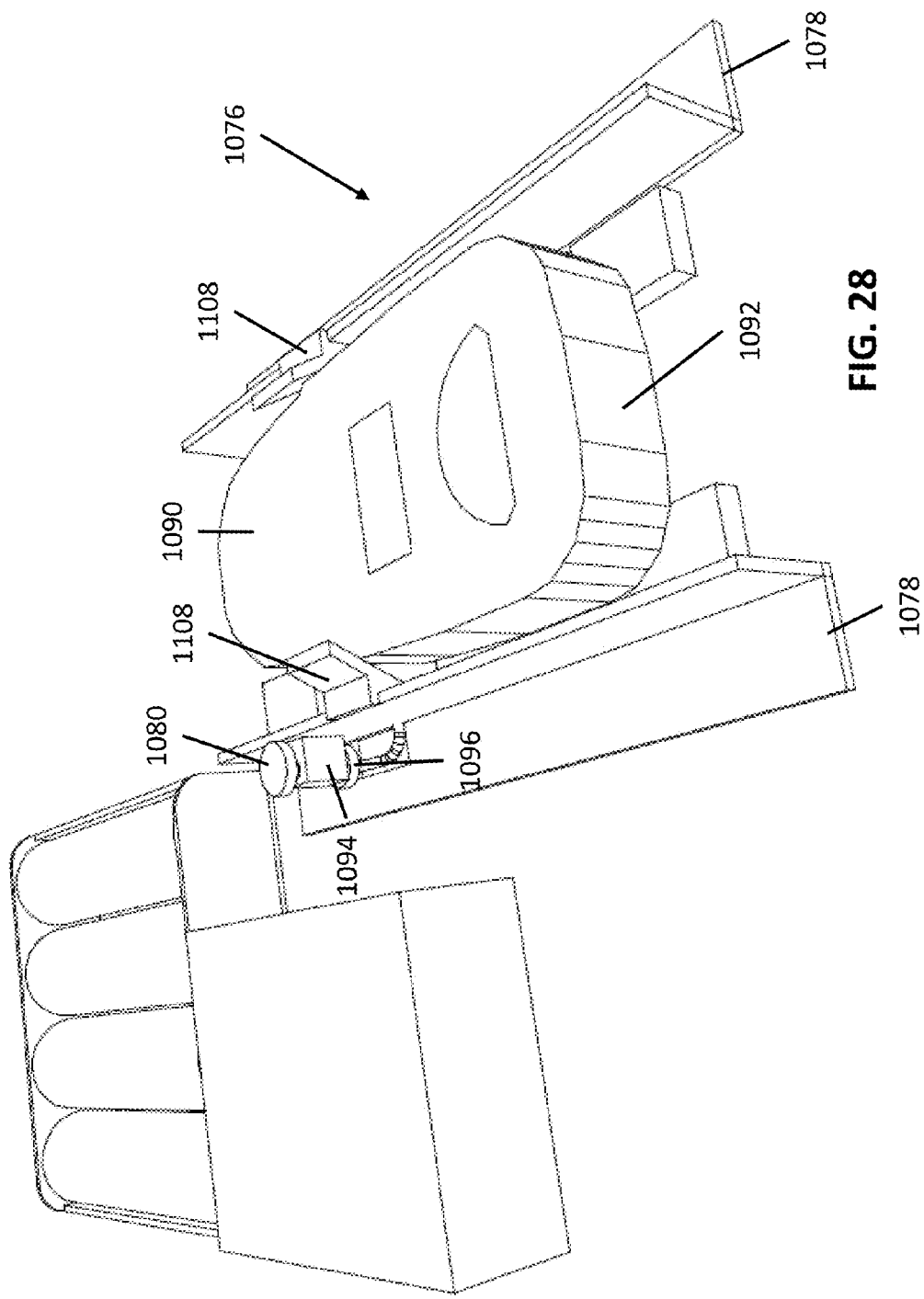
FIG. 28 is an additional alternate embodiment of the actuation system.
Figure 30:
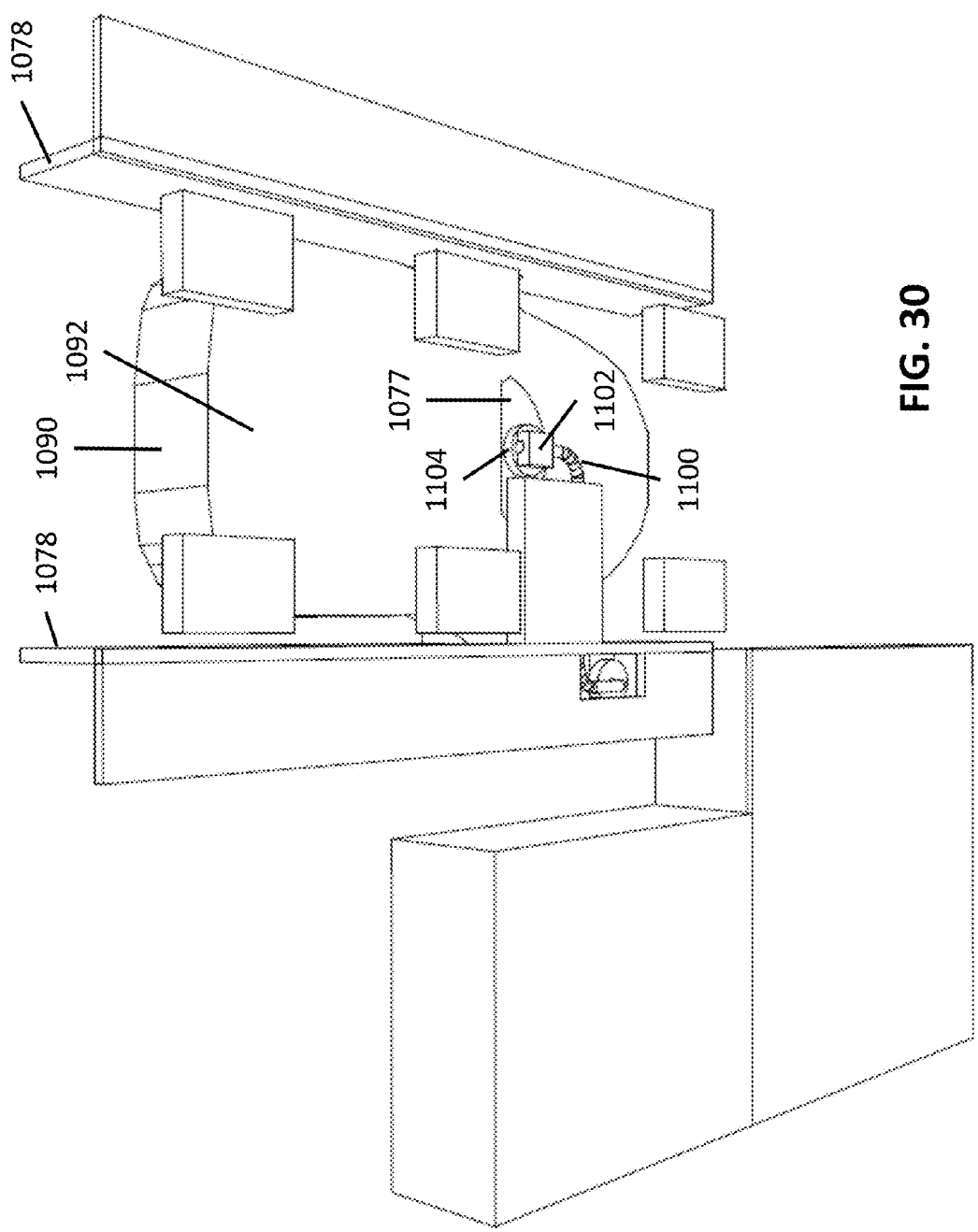
FIG. 30 is a bottom view showing the actuation of a rear button on the key fob.

FIGS. 28 and 30 illustrate another type of key fob 1090 that includes the bottom button 1077 mounted on the bottom face 1092. In this configuration, the contact pad 1080 is mounted to a support block 1094, which in turn engages a lower contact pad 1096. The lower contact pad 1096 is formed as part of a spring steel contact arm 1100. The contact arm 1100 includes another mounting block 1102 having a contact pad 1104. The contact pad 1104 engages the bottom button 1077, as illustrated in FIG. 30. In this manner, the downward, vertical movement created by the plunger is translated to an upward vertical movement of the contact pad 1104 to depress the bottom button 1077.

Figure 29:
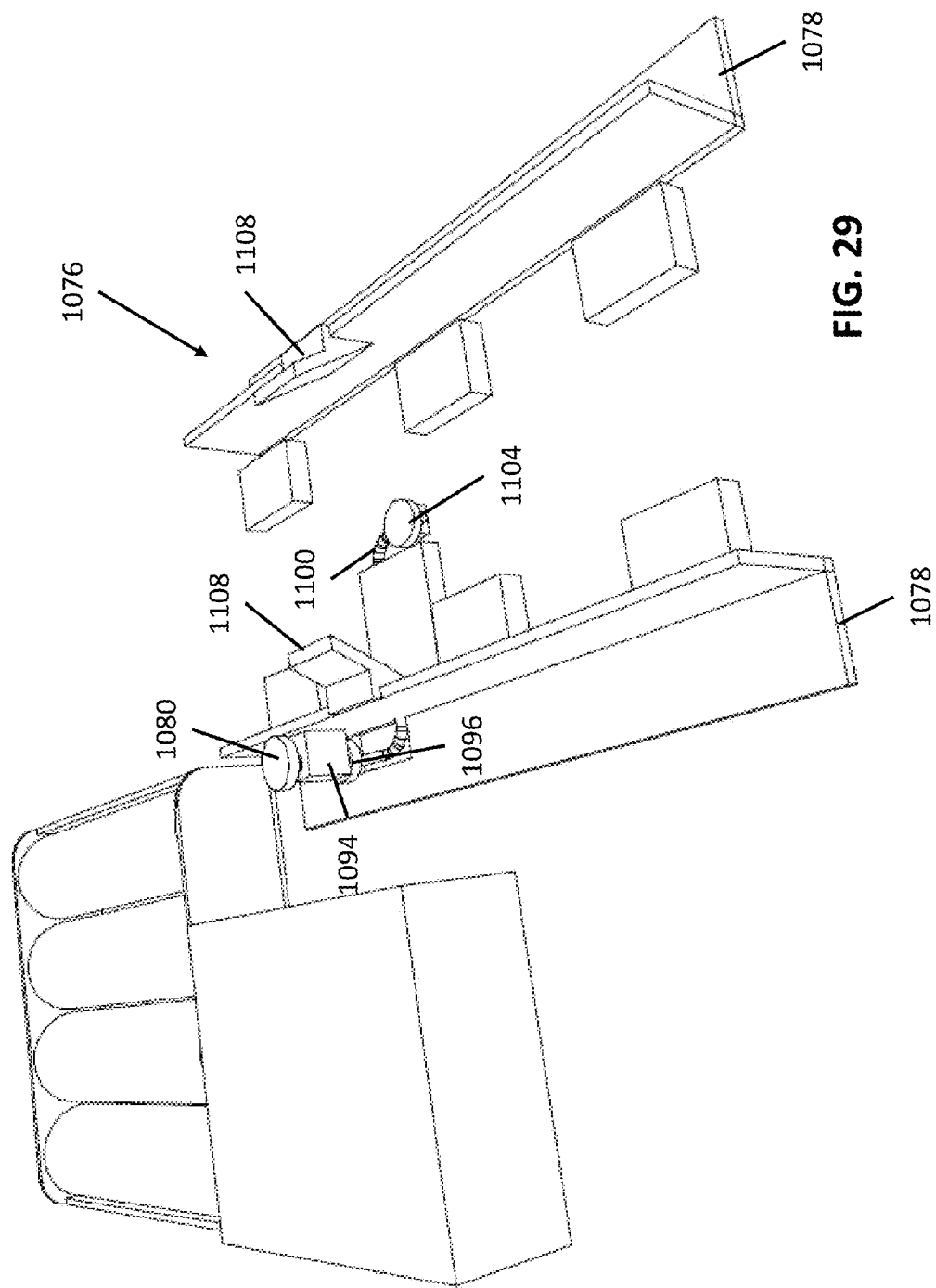
FIG. 29 is a view similar to FIG. 28 with the key fob removed.

As illustrated in FIG. 29, the translation frame 1076 can include a pair of locking fingers 1108 that help to further hold the key fob in place against the upward force created during depression of the bottom button 1077.

As can be understood in the additional embodiments shown in FIGS. 18-30, the actuator 1005 can be of various different configurations for activating control buttons on different types of remote control devices, not just the key fob shown in the figures. The actuator, controller and internal power supply, along with the remote control device, are contained within an enclosure 1008 that is formed from a metal or metalized material. The controller will include an internal antenna to receive signals from the remote control device and will include an external antenna to transmit these signals to the vehicle. The purpose for this isolation of the internal remote control device from any external RF signals is to prevent any interaction with vehicle transmitting RF antennas or attempts by thieves to perform a "man-in-the-middle" amplification attack. The metal enclosure 1008 will block any incoming RF transmissions and the only outgoing RF transmissions would be retransmissions by the controller and an antenna external to the vehicle.

I claim:

1. An actuation system to actuate one or more buttons on a remote control based on command signal generated by a mobile device, the actuation system comprising:
   a remote control support configured to securely receive the remote control and securely retain the remote control in a known location;
   a controller configured to receive the command signal from the mobile device and convert the command signal into position commands; and
   a button actuator having an actuation tip, the button actuator being configured to receive the position commands from the controller and move the actuation tip to a position associated with the button and to move the actuation tip to engage the button of the remote control.

2. The actuation system of claim 1, wherein the remote control includes a plurality of buttons, wherein the mobile device is configured to transmit wireless command signals corresponding to the plurality of buttons, wherein the controller is configurable to position the actuator tip relative to each of the plurality of buttons, and wherein the controller is configurable to press a particular button of the plurality of buttons a particular distance and for a particular interval of time such that the wireless mobile device is operably linked to the actuation of the plurality of buttons on the remote control.

3. The actuation system of claim 1, wherein the button actuator further comprises:
   a rotatable pivot secured to a base; and
   a boom comprising a first end and second end, the boom rotatably mounted on the rotatable pivot at the first end and extendable from the pivot at the second end with the actuator tip fixedly mounted on the second end;
   wherein the button actuator positions the actuator tip by rotating and extending the boom.

4. The actuation system of claim 1, wherein the button actuator further comprises:
   a boom comprising a first end and second end, the boom rotatably mounted on the pivot at the first end and the actuator tip slidably mounted on the boom proximate the second end;
   wherein the button actuator positions the actuator tip by rotating the boom and sliding the actuator tip along the boom.

5. The actuation system of claim 1 further comprising an isolation enclosure, wherein the remote control, controller and button actuator are contained within the isolation enclosure, wherein the isolation enclosure is configured to prevent radio frequency (RF) signals from reach the remote control from outside of the isolation enclosure.

6. The actuation system of claim 5 wherein the isolation enclosure is formed from a metallic material.

7. The actuation system of claim 1, wherein the button actuator comprises:
   a plunger including the activation tip;
   a first servo motor operable to move the plunger in a first direction;
   a second servo motor operable to move the plunger in a second direction transverse to the first direction; and
   a third servo motor operable to move the plunger in a third direction transverse to both the first direction and the second direction.

8. An actuation system to actuate one or more buttons on a remote control device based on wireless command signal generated by a mobile device, the actuation system comprising:
   an isolation enclosure configured to prevent radio frequency (RF) signals from entering into or leaving an open interior;
   a remote control support located within the open interior and configured to securely receive the remote control device and securely retain the remote control device in a known location;
   a controller located within the open interior and configured to receive the command signal from the mobile device and convert the command signal into position commands; and
   a button actuator including a movable plunger having an actuation tip, the button actuator being configured to receive the position commands from the controller and move the actuation tip to a position associated with the one of buttons and to move the actuation tip to engage the one button of the remote control device.

9. The actuation system of claim 8 further comprising:
   a receiving antenna in communication with the controller and positioned to receive the wireless command signal from the mobile device, wherein the receiving antenna is aligned with a first opening in the isolation enclosure;
   a remote control receiving antenna in communication with the controller and located within the open interior of the isolation enclosure, wherein the remote control receiving antenna is configured to receive control signals from the remote control device; and
   a transmitting antenna in communication with the controller and positioned to transmit vehicle command signals from the controller, wherein the transmitting antenna is aligned with a second opening in the isolation enclosure.

10. The actuation system of claim 9 wherein the isolation enclosure is formed from a metallic material.

11. The actuation system of claim 8, wherein the button actuator comprises:
    a plunger including the activation tip;
    a first servo motor operable to move the plunger in a first direction;
    a second servo motor operable to move the plunger in a second direction transverse to the first direction; and
    a third servo motor operable to move the plunger in a third direction transverse to both the first direction and the second direction.

12. The actuation system of claim 11 further comprising a plurality of support pads positioned on a bottom wall of the isolation enclosure to receive the remote control device and securely hold the remote control device in a desired position within the open interior.

13. The actuation system of claim 11 wherein the movement of the plunger in the third direction activates one of the buttons on the remote control device.

14. The actuation system of claim 13 further comprising a force translating device positioned within the open interior of the isolation enclosure, wherein the translating device converts movement of the plunger in the third direction to movement of the force translating device in a direction transverse to the third direction.

15. The actuation system of claim 13 further comprising a force translating device positioned within the open interior of the isolation enclosure, wherein the translating device converts movement of the plunger in the third direction to movement of the force translating device in a direction opposite the third direction.

16. The actuation system of claim 11 further comprising a plurality of reference posts positioned at known locations within the open interior of the isolation enclosure, wherein the reference posts are utilized by the controller to locate the remote control device within the open interior.

17. An actuation system to actuate one or more buttons on a vehicle key fob based on wireless command signal generated by a mobile device, the actuation system comprising:
- an isolation enclosure configured to prevent radio frequency (RF) signals from entering into or leaving an open interior;
- a remote control support located within the open interior and configured to securely receive the key fob and securely retain the key fob in a known location;
- a controller located within the open interior and configured to receive the command signal from the mobile device and convert the command signal into position commands;
- a receiving antenna in communication with the controller and positioned to receive the wireless command signal from the mobile device, wherein the receiving antenna is aligned with a first opening in the isolation enclosure;
- a key fob receiving antenna in communication with the controller and located within the open interior of the isolation enclosure, wherein the key fob receiving antenna is configured to receive control signals from the key fob;
- a transmitting antenna in communication with the controller and positioned to transmit vehicle command signals from the controller, wherein the transmitting antenna is aligned with a second opening in the isolation enclosure; and
- a button actuator including a movable plunger having an actuation tip, the button actuator being configured to receive the position commands from the controller and move the actuation tip to a position associated with the one of buttons and to move the actuation tip to engage the one button of the key fob, the button actuator including:
  - a first servo motor operable to move the plunger in a first direction;
  - a second servo motor operable to move the plunger in a second direction transverse to the first direction; and
  - a third servo motor operable to move the plunger in a third direction transverse to both the first direction and the second direction.

18. The actuation system of claim 17 wherein the isolation enclosure is formed from a metallic material.

* * * * *